(12) United States Patent
Matsushima et al.

(10) Patent No.: US 7,206,767 B2
(45) Date of Patent: *Apr. 17, 2007

(54) CONTENT DISTRIBUTION SYSTEM AND A REFERENCE SERVER

(75) Inventors: Hideki Matsushima, Studio City, CA (US); Masayuki Kozuka, Arcadia, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 278 days.

This patent is subject to a terminal disclaimer.

(21) Appl. No.: 11/060,554

(22) Filed: Feb. 18, 2005

(65) Prior Publication Data

US 2005/0165688 A1 Jul. 28, 2005

Related U.S. Application Data

(60) Division of application No. 09/890,769, filed as application No. PCT/US00/32756 on Dec. 1, 2000, now Pat. No. 6,912,514, which is a continuation-in-part of application No. 09/453,528, filed on Dec. 3, 1999, now abandoned.

(51) Int. Cl.
*G06Q 99/00* (2006.01)
(52) U.S. Cl. .............................. 705/52; 705/40; 705/57
(58) Field of Classification Search .................. 705/52, 705/57, 40
See application file for complete search history.

(56) References Cited

U.S. PATENT DOCUMENTS

| | | | |
|---|---|---|---|
| 5,677,953 A | 10/1997 | Dolphin | |
| 5,819,285 A | 10/1998 | Damico et al. | |
| 5,943,422 A | 8/1999 | Van Wie et al. | |
| 6,038,591 A | 3/2000 | Wolf et al. | |
| 6,167,443 A | 12/2000 | Decker et al. | |
| 6,427,140 B1 * | 7/2002 | Ginter et al. | 705/80 |
| 6,629,138 B1 | 9/2003 | Lambert et al. | |
| 6,658,568 B1 * | 12/2003 | Ginter et al. | 713/193 |

FOREIGN PATENT DOCUMENTS

| | | | |
|---|---|---|---|
| JP | 411213010 | | 8/1999 |
| JP | 411213010 A | * | 8/1999 |
| JP | 2005198043 | * | 7/2005 |

* cited by examiner

*Primary Examiner*—Pierre Eddy Elisca
(74) *Attorney, Agent, or Firm*—Wenderoth, Lind & Ponack, L.L.P.

(57) ABSTRACT

A content distribution system includes a reference server 112, and a plurality of distribution servers 101 to 108. The reference server 112 holds URLs showing network locations of the plurality of distribution servers 101 to 108, and transmits an URL for a distribution server to a user terminal in response to a user request. When one of the distribution servers 101 to 108 is accessed by a user terminal, the distribution server 101 to 108 determines whether access has been performed as a result of receiving location information from the reference server 112. If this is the case, the distribution server 101 to 108 generates payment information commanding the user terminal to pay the distribution server and the reference server 112, and transmits a distribution package including the payment information and a digital content to the user terminal.

12 Claims, 24 Drawing Sheets

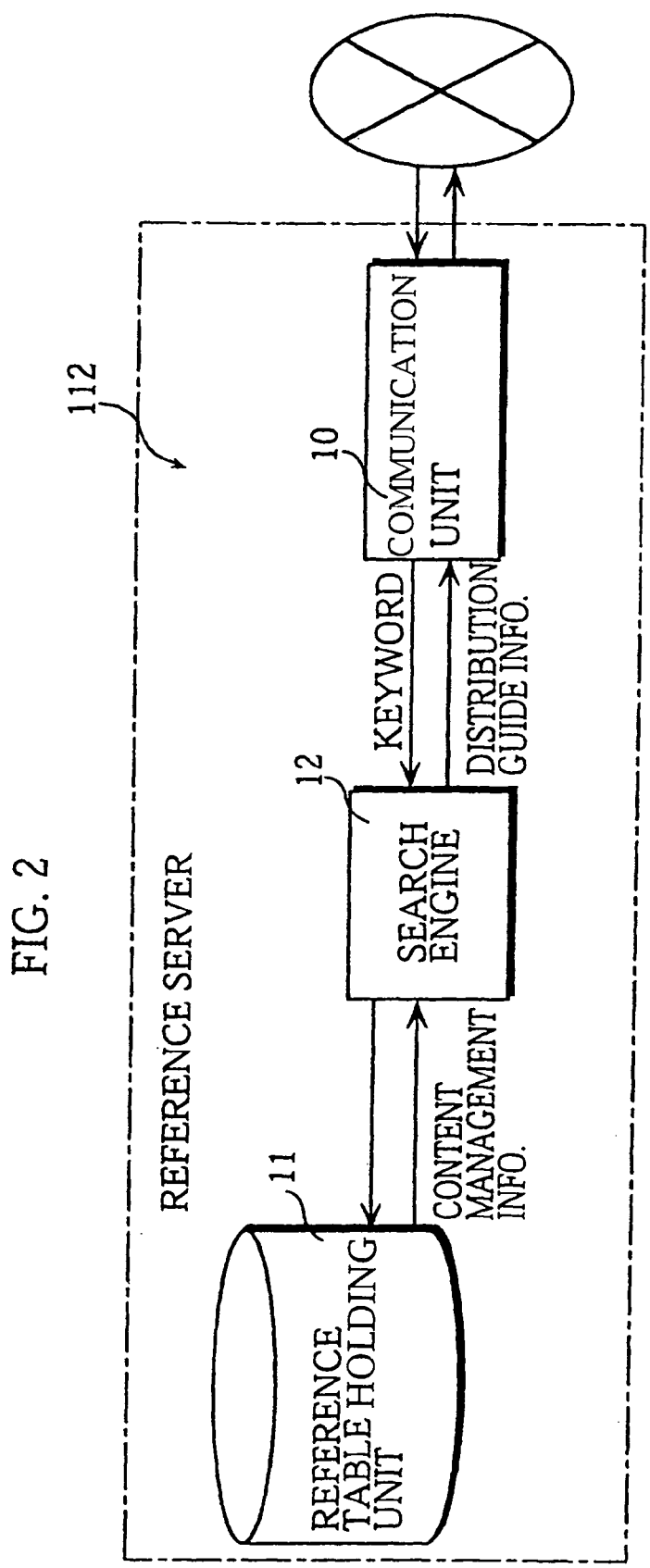

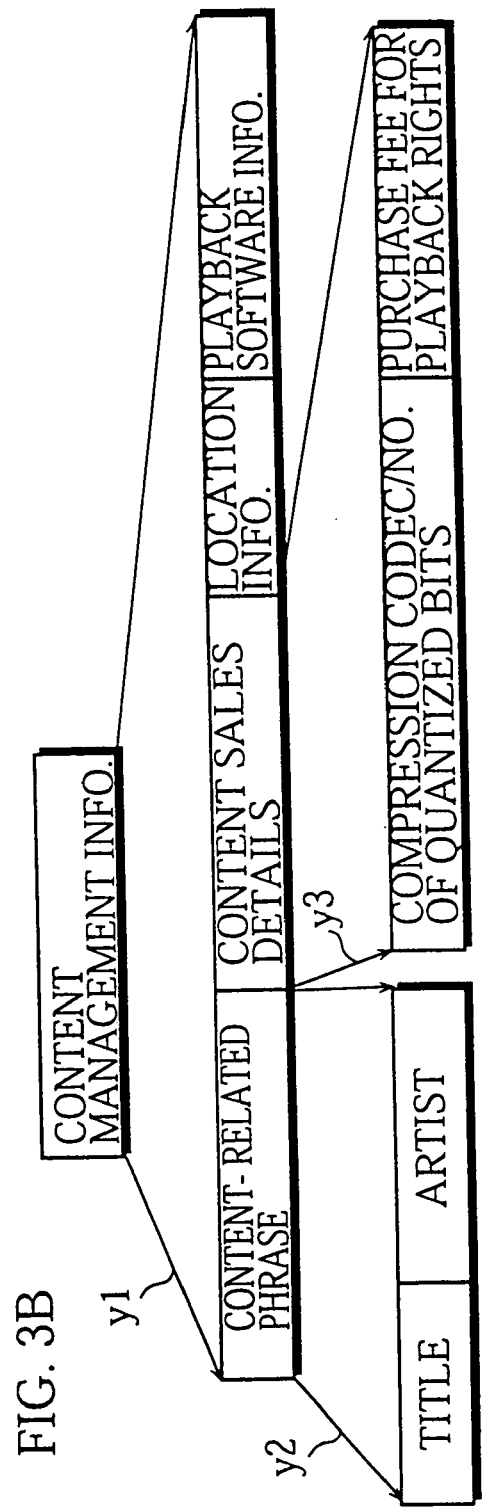

FIG. 4

EXAMPLE OF REFERENCE TABLE

| TITLE | ARTIST | COMPRESSION CODEC/NO. OF QUANTIZED BITS | PURCHASE FEE FOR PLAYBACK RIGHTS | SERVER LOCATION INFO. | PLAYBACK SOFTWARE INFO. |
|---|---|---|---|---|---|
| Poor Minor | Mr.Artist1 | AAC · 128kbps | $3.00 | URL OF SERVER 101 | PLAYBACK SOFTWARE A |
| Yet Breaker | Ms.Artist2 | AAC · 96kbps | $1.50 | URL OF SERVER 102 | PLAYBACK SOFTWARE B |
| Star on BusStop | Mrs.Artist3 | Mp3 · 128kbps | $1.50 | URL OF SERVER 103 | PLAYBACK SOFTWARE C |
| Forgotten Hero | Sir.Artist4 | AAC · 128kbps | $3.00 | URL OF SERVER 104 | PLAYBACK SOFTWARE A |
| Local SuperStar | Artist5 Jr. | AAC · 96kbps | $1.50 | URL OF SERVER 105 | PLAYBACK SOFTWARE C |
| Nightmare Come True | Mr.Artist6 | AAC · 128kbps | $3.00 | URL OF SERVER 106 | PLAYBACK SOFTWARE A |
| Field of BlackHall | Sir.Artist7 | Mp3 · 128kbps | $1.00 | URL OF SERVER 107 | PLAYBACK SOFTWARE B |

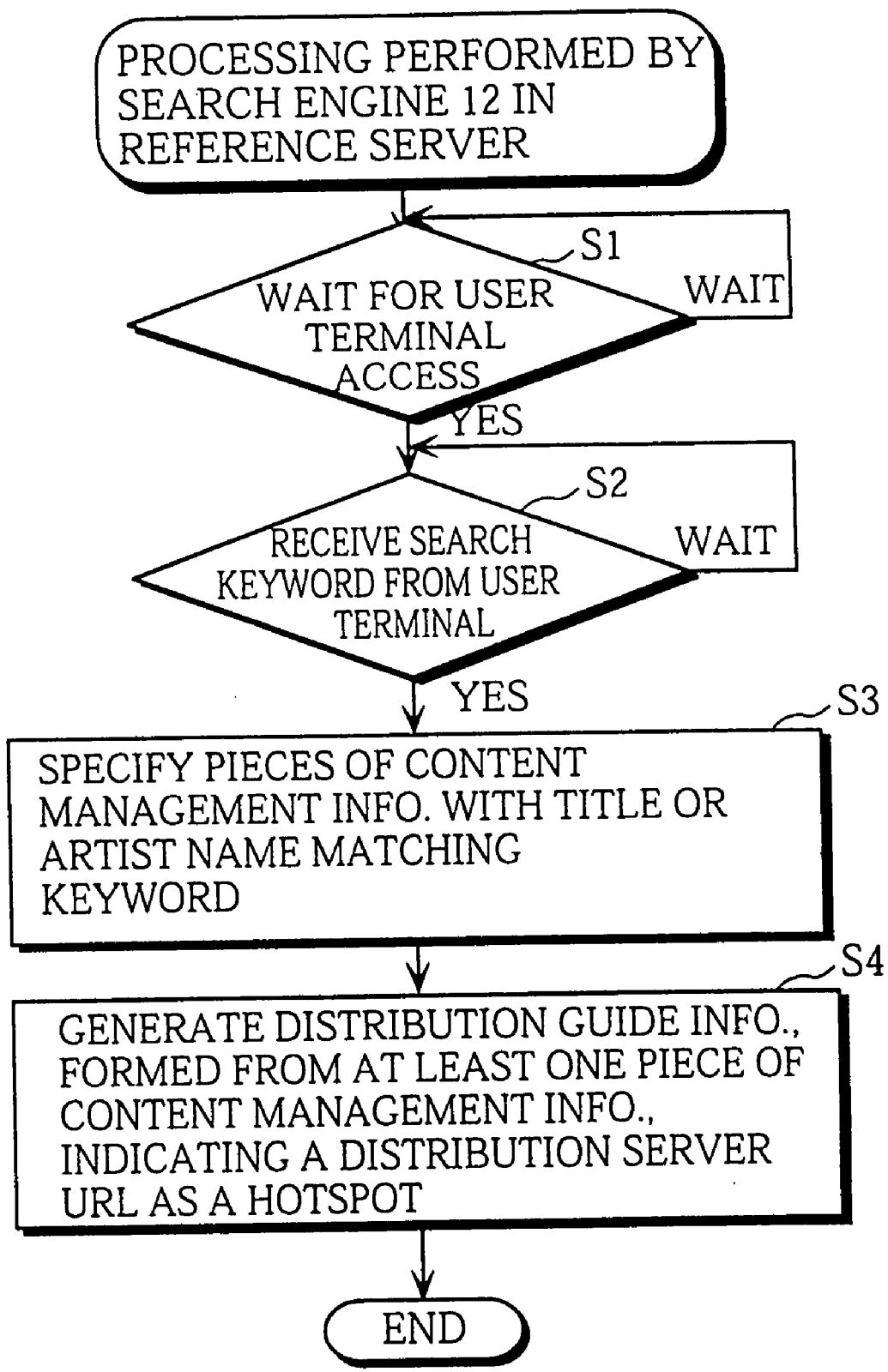

FIG. 6A

CONTENT DISTRIBUTION SERVER SEARCH
ENTER A CONTENT KEYWORD

Star

FIG. 6B

DISTRIBUTION GUIDE INFO.

| TITLE | ARTIST | COMPRESSION CODEC/NO. OF QUANTIZED BITS | PURCHASE FEE FOR PLAYBACK RIGHTS | SERVER LOCATION INFO. | PLAYBACK SOFTWARE INFO. |
|---|---|---|---|---|---|
| Star on BusStop | Mrs.Artist3 | Mp3 · 128kbps | $1.50 | URL OF SERVER 103 | PLAYBACK SOFTWARE C |
| Local SuperStar | Artist5 Jr. | AAC · 96kbps | $1.50 | URL OF SERVER 105 | PLAYBACK SOFTWARE C |

FIG. 6C

RESULTS OF CONTENT DISTRIBUTION SERVER SEARCH

SEARCH RESULTS ARE AS FOLLOWS.

| TITLE | ARTIST | COMPRESSION CODEC/NO. OF QUANTIZED BITS | PURCHASE FEE FOR PLAYBACK RIGHTS | SERVER LOCATION INFO. | PLAYBACK SOFTWARE INFO. |
|---|---|---|---|---|---|
| Star on BusStop | Artist3 | Mp3 · 128kbps | $1.50 | URL OF SERVER 103 | PLAYBACK SOFTWARE C |
| Local SuperStar | Artist5 | AAC · 96kbps | $1.50 | URL OF SERVER 105 | PLAYBACK SOFTWARE C |

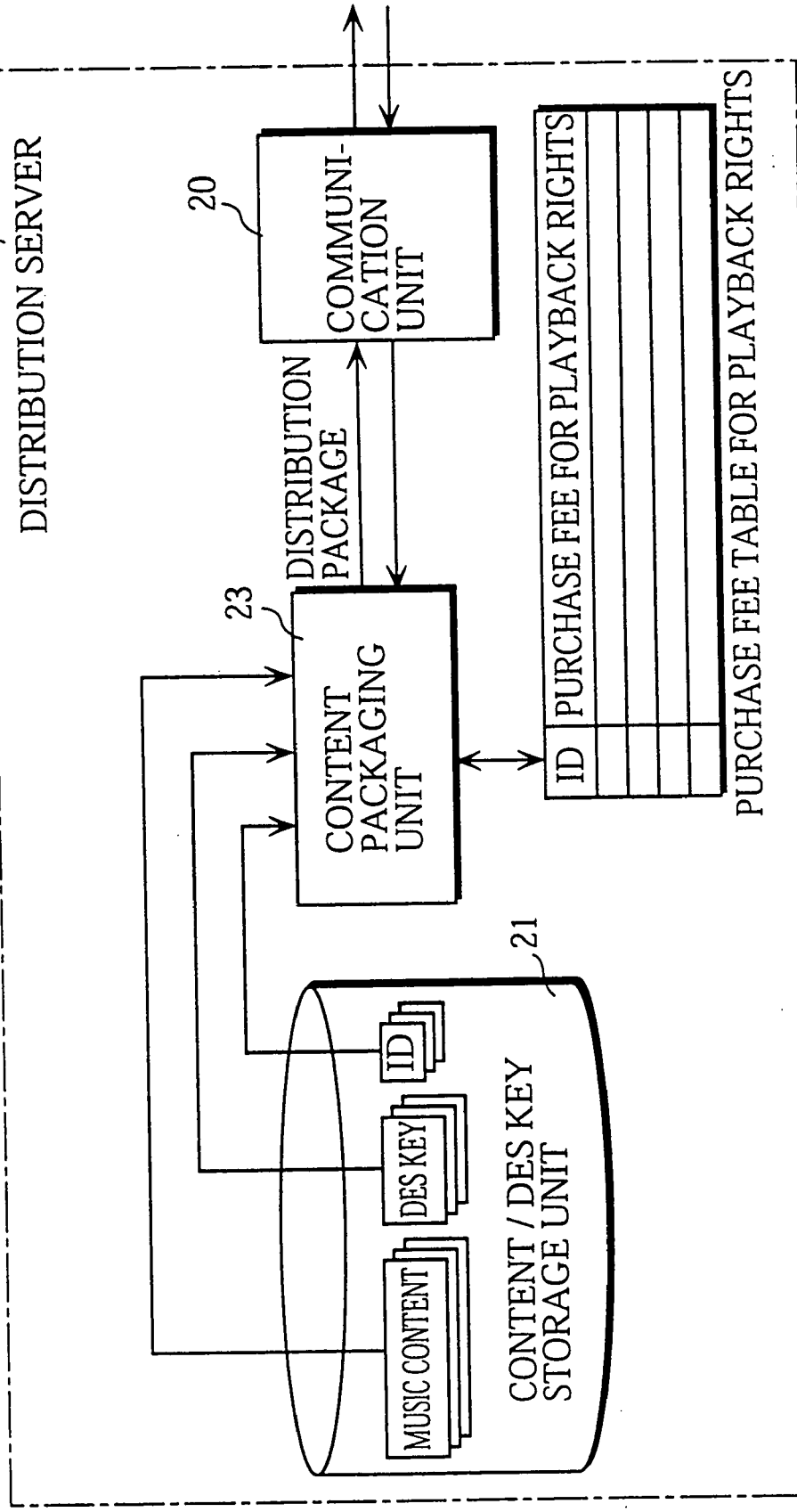

FIG. 11

| INDEX NO. | CONTENT ID | PACKAGE STORAGE LOCATION INFO. |
|---|---|---|
| 1 | USMEI9900001 | C:/package/Song1 |
| 2 | USMEI9903402 | C:/package/Song2 |
| 3 | JPMEI9900001 | C:/package/Song3 |
| 4 | JPMEI9800001 | C:/package/Song4 |
| 5 | USMEI9912345 | C:/package/Song5 |
| 6 | USMEI9900001 | C:/package/Song6 |
| 7 | UKMEI971344 | C:/package/Song7 |

PACKAGE MANAGEMENT TABLE

FIG. 12

PURCHASE INFO. MANAGEMENT TABLE

| INDEX NO. | CONTENT STORAGE LOCATION INFO. | PURCHASE STATUS INFO. | KEY STORAGE LOCATION INFO. |
|---|---|---|---|
| 1 | C:/AudioData/Song1 | PURCHASED | C:/Key/Song1 |
| 2 | C:/AudioData/Song2 | PURCHASED | C:/Key/Song2 |
| 3 | — | UNPURCHASED | — |
| 4 | C:/AudioData/Song4 | PURCHASED | C:/Key/Song4 |
| 5 | — | UNPURCHASED | — |
| 6 | C:/AudioData/Song6 | PURCHASED | C:/Key/Song6 |
| 7 | C:/AudioData/Song7 | PURCHASED | C:/Key/Song7 |

FIG. 16
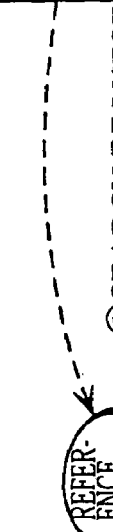

FIG. 17

②DETERMINE WHETHER USER TERMINAL HAS MADE DOWNLOAD REQUEST VIA REFERENCE SERVER
③IF NOT, SET PAYMENT INFO. HAVING ALL OF PURCHASE FEE PAID TO DISTRIBUTION SERVER

DISTRIBUTION SERVER 105
DISTRIBUTION SERVER 106
DISTRIBUTION SERVER 107, 108
DISTRIBUTION SERVER 110
DISTRIBUTION SERVER 104
DISTRIBUTION SERVER 102
DISTRIBUTION SERVER 101
REFERENCE SERVER

BILLING SERVER

⑤100% OF PURCHASE FEE

④ DISTRIBUTION PACKAGE (PAYMENT INFO.)

① DOWNLOAD REQUEST

PURCHASE FEE

USER TERMINAL 109

CONTENT DISTRIBUTION SYSTEM AND A REFERENCE SERVER

This application is a divisional of U.S. application Ser. No. 09/890,769, filed Aug. 3, 2001, now U.S. Pat. 6,912, 514, which is a national stage application of International application No. PCT/US00/32756, filed Dec. 1, 2000, which is a continuation-in-part of U.S. application Ser. No. 09/453, 528, filed Dec. 3, 1999, now abandoned.

TECHNICAL FIELD

The present invention relates to a content distribution system for realizing a content distribution service including a distribution server for fee-paying distribution of digital contents, and a reference server.

BACKGROUND ART

Content distribution services used for fee-paying distribution of digital contents are one of a number of network businesses at present receiving a great deal of attention from the music industry. An example of such a service is Electronic Music Distribution (EMD). A large number of corporations and individuals are participating in EMD, with the aim of taking advantage of the new business opportunities that it offers. A conventional distribution system that realizes EMD includes a user terminal, a distribution server, and a billing server. Such a system distributes music contents for a fee, the music contents having been encoded using an audio compression codec such as MP3 (Moving Picture Experts Group 1 Audio Layer 3), Dolby AC-3 (Digital Audio Compression) or AAC (Advanced Audio Coding).

A user accesses a Web site by inputting an URL (Uniform Resource Locator) or similar into a user terminal, and requests that a music content be downloaded from the distribution server. The music content is downloaded using a conventional Web browser such as Netscape's Internet Explorer, and stored in an encrypted state in the memory of the user terminal.

Upon receiving a download request from the user terminal, the distribution server transmits the music content to the user terminal.

Once the music content has been transmitted to the user terminal, the billing server bills the user for the music content by informing the user terminal of the purchase fee required for the music contents.

Distribution servers operated by major record companies are well publicized, but those operated by independent artists tend to be overlooked. For the independent artist who is not signed to a major record label, the music contents they create are a vital source of revenue. Such artists are therefore reluctant to surrender control of music contents to a third party, and instead attempt to manage their distribution on their own privately-operated server. For this reason, there are a large number of distribution servers operated by independent artists, and the total number of distribution servers operated on the World Wide Web (WWW) is said to be several hundred or even several thousand.

However, in such a situation, where a large number of distribution servers are competing for services on the WWW, music content sales will inevitably be monopolized by the major record companies, and distribution servers operated by independent artists will face an increasingly uphill struggle in their fight to obtain a share of the music content market. The root of this problem lies in the fact that the distribution servers of the major record companies can obtain a high profile by advertising the URL of their Web site in the media, for example via television or magazines. As a result, the distribution servers operated by major record companies are accessed by a large number of users, to whom they can then sell music contents. Conversely, distribution servers operated by independent artists have little or no opportunity to publicize their Web site URL in the media. Therefore, such distribution servers have no alternative but to wait for users to access their Web site by searching the WWW using a title or artist name as a keyword.

When a user searches the Web using a keyword such as a title or artist name, all Web sites that happen to include the same word will be hit. Consequently, the user will be presented with an enormous list of some hundreds of search results. Searching such a list to find the distribution server for a particular independent artist requires a great deal of patience, and very few users are prepared to go to that amount of trouble to find a distribution server for an independent artist. Consequently, even if the artist concerned has created high quality music contents, it will not be possible for their talent to be recognized by the general public if they manage their own music contents on an independent distribution server in this way, and they will remain in obscurity.

The major record companies recognize that extremely talented musicians exist among the independent artists, and it is not their desire that artists of such talent be consigned to oblivion. Provided that their profits can be safeguarded, therefore, the major record companies are quite prepared to support the activities of independent artists. However, conventional distribution systems are not provided with a method for supporting independent artists that satisfies the requirements of the major record companies. The inventors of this invention believe that the true direction of EMD lies in providing a contents distribution system that encompasses support for independent artists.

SUMMARY OF THE INVENTION

The object of the present invention is to provide a contents distribution system that gives distribution servers such as those operated by independent artists a greater number of opportunities to sell music contents.

The above object is achieved by a content distribution system including at least one distribution server for distributing digital contents via a network in response to requests from user terminals. The content distribution system includes a reference server operable to hold at least one piece of location information showing a location of a distribution server on the network, and transmit one of the pieces of location information to one of the user terminals in response to a user request. Here, each distribution server includes a determining unit, a generating unit and a transmitting unit. The determining unit is operable to determine, when the distribution server is accessed by one of the user terminals, whether the user terminal has connected to the distribution server using one of the at least one pieces of location information received from the reference server as a connection target. The generating unit is operable to generate (1) a piece of first payment information instructing the user terminal to pay a purchase fee to the distribution server, when the user terminal is determined to have connected without receiving the piece of location information from the reference server, and (2) a piece of second payment information instructing the user terminal to pay a purchase fee to both the distribution server and the reference server, when the user terminal is determined to have connected using the piece of location information received from the reference server. The transmitting unit is operable to transmit (a) one of the generated pieces of first and second payment information and (b) a digital content to the user terminal. When the distribution server is operated by an independent artist, the artist in question can inform a large number of user terminals of digital contents that they have created, as well as the network location of the distribution server from which the contents can be obtained, by using the services of the reference server. The reference server is operated by a major record company, which receives part of the payment made to purchase a digital content as commission. This arrangement is to the mutual benefit of both independent artists and major companies.

The reference server may include a first storage unit, a receiving unit, and a search unit. The receiving unit is operable to store a plurality of pieces of location information, each showing a location of one of the plurality of distribution servers, in correspondence with content-related phrases, each relating to a digital content transmitted by the distribution server. The receiving unit is operable to receive a keyword input from the user terminal when the user terminal performs an access. The search unit is operable to search for at least one piece of location information with a content-related phrase partially or wholly matching the keyword input, and output the matching at least one piece of location information to the user terminal. This ensures that when a distribution server search is made using a title, artist name or the like as a keyword, only distribution servers distributing music contents including the title or artist name are transmitted to the user terminal as search results. Consequently, other Web sites that are not distribution servers, but just happen to include the input title or artist name input by the user as a keyword, are not transmitted to the user terminal as search results. Since only locations of distribution servers distributing music contents desired by the user are transmitted to the user terminal, the user can access the distribution server from which the desired music content can be obtained without needing to perform an operation to weed out the desired distribution server from a huge number of search results.

The first storage unit may further be operable to store a plurality of pieces of content sales information in correspondence with content-related phrases for each digital content, each piece of content sales information showing, for each digital content, one of an encoding method, a playback quality, and a purchase fee for playback rights. Here, the reference server may further include a distribution guide generation unit operable to fetch, if the search unit has found content-related phrases matching the keyword, pieces of content sales information corresponding to the content-related phrases, and generating distribution guide information from the pieces of content sales information. Here, the search unit is operable to transmit the generated distribution guide information to the user terminal in correspondence with pieces of location information for distribution servers transmitting corresponding digital contents. Differences in production environment generate variations in the encoding method, and playback quality of music contents, and since there is not yet a universal standard in the field, purchase prices also vary greatly. However, once a user has input a keyword and requested a distribution server search, the reference server informs the user of the location of the distribution server and the encoding method, playback quality, and purchase price required for playback rights for the music content. Consequently, the user can gain information regarding the encoding method, playback quality, and purchase price of the music content prior to accessing the distribution server. A user who accesses a distribution server via the reference server in this way, purchases the music content being in full awareness of the facts. Consequently, a situation in which actual playback quality of the purchased music content is different from what the user envisaged, resulting in a dispute between the independent artist and the user, can be avoided.

The first storage unit may further be operable to store pieces of playback software information, each showing playback software for playing back a digital content, in correspondence with location information for each distribution server transmitting the digital content. Furthermore, the receiving unit may be operable to receive, from the user terminal, a piece of playback software information indicating a playback software used by the user terminal, together with a keyword specifying the digital content. Also, the search unit may be operable to inform the user terminal, when a plurality of content-related phrases matching the keyword exist, of only the content-related phrases with a corresponding piece of playback software information matching the piece of playback software information generated by the user terminal. This structure enables the user to be informed in advance of the playback software to which the music contents distributed by this distribution server correspond. As a result, problems caused by the playback software used by the user differing from the playback software used by the artist can be avoided.

BRIEF DESCRIPTION OF THE DRAWINGS

FIG. 2 shows an internal structure of a reference server;

FIG. 3A shows reference tables including pieces of content management information 1, 2, 3, 4, 5 . . . ;

FIG. 3B shows a data structure for content management information;

FIG. 4 shows an actual example of a reference table;

FIG. 5 is a flowchart showing processing performed by a search engine 12;

FIG. 6A illustrates how input of a keyword relating to music contents is performed;

FIG. 6B shows distribution guide information formed from pieces of content management information including a keyword 'star';

FIG. 6C is a menu screen displayed on a user terminal by transmitting the distribution guide information shown in FIG. 6B;

FIG. 7 shows an internal structure for a distribution server;

FIG. 11 shows an example of pieces of package management information in a package storage area 32;

FIG. 12 shows an example of a purchase information management table;

FIG. 16 shows movement of data between servers and the user terminal when the user terminal downloads a music content via a reference server;

FIG. 17 shows movement of data between servers and the user terminal when the user terminal downloads a music content, bypassing the reference server;

DETAILED DESCRIPTION OF THE INVENTION

First Embodiment

Figure 1:
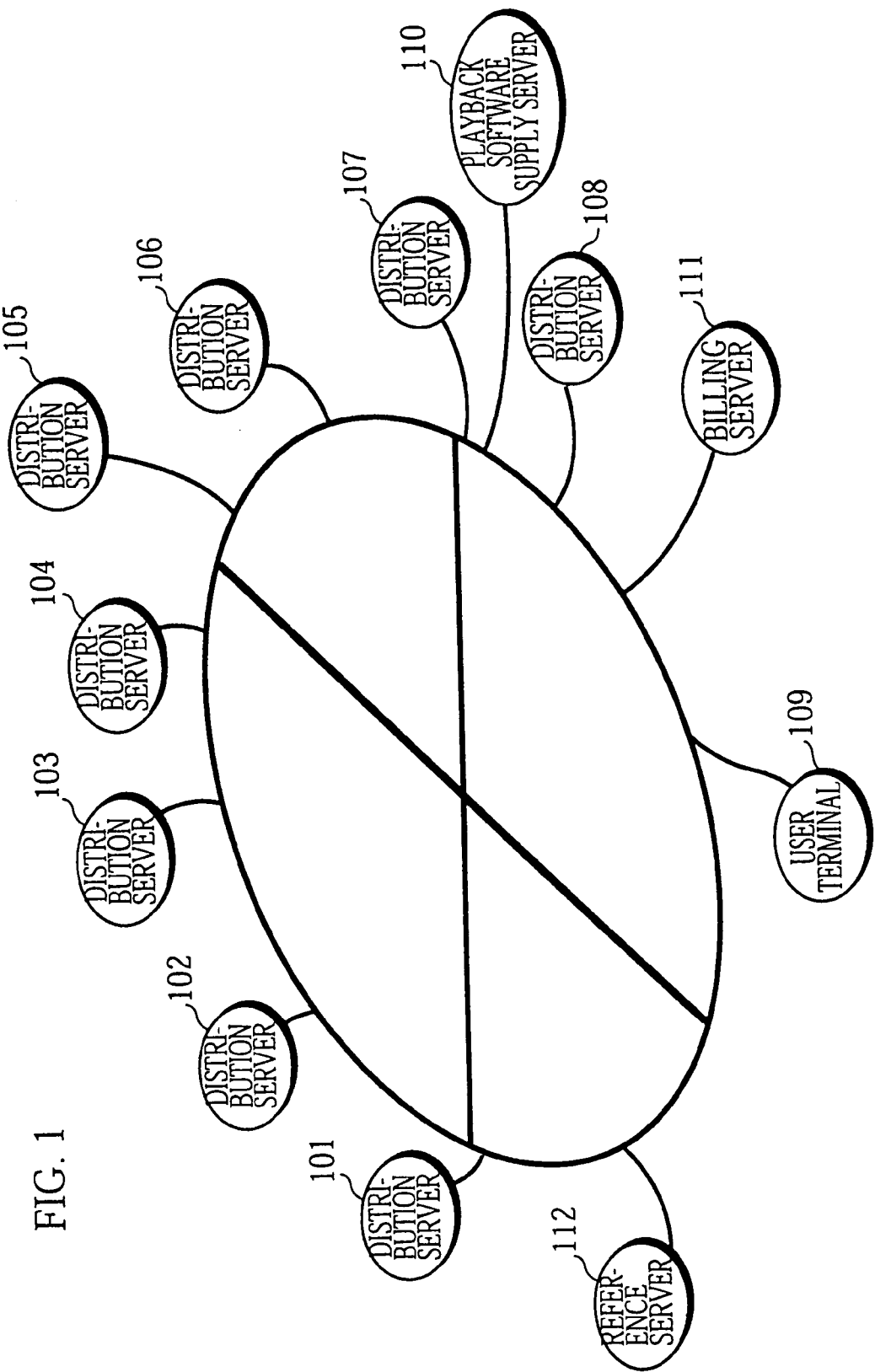
FIG. 1 shows a structure of a content distribution system of a first embodiment.

The following is an explanation of a content distribution system with reference to the drawings. FIG. 1 shows a structure for a content distribution system in a first embodiment. As shown in the drawing, this content distribution system includes distribution servers 101 to 108, a user terminal 109, a playback software supply server 110, a billing server 111, and a reference server 112. The distribution system may contain a plurality of user terminals 109, but only one is described here for the sake of simplicity.

The distribution servers 101 to 108 receive requests to download music contents issued by the user terminal 109, and transmit music contents to the user terminal 109.

The user terminal 109 is a personal computer, or corresponding information processing device or audio device, in which playback software in an audio format such as Liquid Audio or a2b has been installed. The user terminal 109 makes a request to download a music content from one of the distribution servers 101 to 108. Having received a music content that has been transmitted from one of the distribution servers 101 to 108, the user terminal 109 stores the received music content in a disk drive (part of the user terminal 109), and reproduces the music content. The playback software realizes various controls relating to playback of the music content in the period between (a) downloading of the music content and (b) purchase of playback rights and playback of the music content. In addition to Liquid Audio and a2b, various types of software compliant with the Secure Digital Music Initiative (SDMI) are available. Once such a playback software has been installed, music contents distributed by the distribution servers 101 to 108 can be played back.

The playback software supply server 110 is operated by a manufacturer of playback software. The playback supply server 110 transmits playback software, such as an audio player, to the user terminal 109 free of charge, in response to a request from the user terminal 109.

The billing server 111 allows payment for playback rights of music contents to be performed over the network. In other words, the billing server 111 is already in possession of a credit card number and corresponding bank account details for each potential user of the content distribution system. When a content is purchased, the user terminal 109 transmits a user ID, information indicating a music content purchase fee, and details of a bank account into which the purchase fee is to be deposited to the billing server 111. Once this has taken place, the billing server 111 debits the purchase fee from the bank account corresponding to the credit card number of the user concerned, and deposits the purchase fee into the creditor's bank account. If the account name for the creditor's bank account is the operator of one of servers 101 to 108, or of reference server 112, this operator receives all or part of the purchase fee. The billing server 111 realizes payment settlement by transmitting and receiving payment information via the network.

The reference server 112 operates a service that informs the user terminal 109 which distribution server distributes a music content that the user wishes to purchase (a music content search service). FIG. 2 shows an internal structure of the reference server 112. As shown in the drawing, the reference server 112 includes a communication unit 10, a reference table holding unit 11, and a search engine 12.

The communication unit 10 is formed from a LAN card, a modem, an ISDN (integrated services digital network) terminal adaptor and the like, and transmits and receives data via the network.

The reference table holding unit 11 holds a reference table. The reference table is formed from a plurality of pieces of content management information 1, 2, 3, 4, 5, . . . as shown in FIG. 3A. Each piece of content management information is formed from, as shown between arrows y1 in FIG. 3B, a 'content-related phrase', 'content sale details', 'location information' indicating a network location for one of the distribution servers 101 to 108, and 'playback software information' indicating a playback software corresponding to the relevant music content. The content-related phrase is formed from such information as a 'title' and an 'artist name', as indicated between arrows y2 in the drawing. The content sale details include, 'compression codec/number of quantized bits' indicating the compression method and playback quality level of the music content, and a 'purchase fee for playback rights' required to playback the music content, as shown between arrows y3.

The following is an explanation of the reference table with reference to FIG. 4. In the drawing, the music content with a title name 'Poor Minor' is the creation of an artist 'Mr. Artist 1'. This music content is compressed using AAC, which is one type of audio compression codec, the number of quantized bits is 128 kbps, and a purchase price of $3.00 is required for playback. The music content with the title name 'Poor Minor' can be obtained from the distribution server 101, so the URL of the distribution server 101 is written in the location information for this music content. The playback software corresponding to this music content is a playback software A, so the playback software A is indicated in the playback software information.

The search engine 12 has a menu for prompting input of a keyword displayed by the user terminal 109 when the reference server 112 is accessed by the user terminal 109 (process a). Once a keyword has been input into the menu, the search engine 12 specifies all pieces of content management information included in the reference server that have a title name or artist name that wholly or partially matches the keyword (process b). Then, the search engine outputs distribution guide information including these pieces of content management information to the user terminal 109 (process c). The flowchart shown in FIG. 5 shows the detailed processing performed in processes a to c. FIGS. 6A to 6C show a procedure that is performed when the search engine 12 processes the data shown in FIG. 4.

The following is an explanation of the actual processing performed by the search engine 12 with reference to the flowchart in FIG. 5, and FIGS. 6A and 6B. At step S1, the search engine 12 waits to be accessed by the user terminal 109. Once the user terminal 109 has performed an access, at step S2, the search engine 12 receives a search keyword from the user terminal 109. Having received the search keyword, at step S3, the search engine specifies all pieces of content management information including a title name or artist name that matches the input keyword. Once the pieces of content management information have been specified, at step S4, the search engine generates distribution guide information formed from one or more pieces of specified content information that indicate URLs for one or more corresponding distribution servers 101 to 108 as hotspots, and transmits the generated distribution guide information to the user terminal 109. Here, if the reference table is set as shown in FIG. 4, and the user operating user terminal 109 inputs the keyword 'star', the search engine 12 specifies the title 'star on BusStop' on the third line of FIG. 4, and the title 'Local Superstar' on the fifth line of FIG. 4 as pieces of content management information including the keyword 'star'.

As a result, as shown in FIG. 6B, distribution guide information formed from the pieces of content management information including these titles is generated. FIG. 6C shows the menu screen that is displayed on the user terminal 109 by transmitting the distribution guide information of FIG. 6B to the user terminal 109. If the user clicks 'URL of distribution server 103' or 'URL of distribution server 105', indicating the locations of the distribution servers 103 and 105 respectively, in the menu screen, the user terminal 109 connects from the reference server 112 to either the distribution server 103 or the distribution server 105. Conventionally, if a user searches the WWW using a common word such as 'star' as a keyword, this will result in a large number of websites, numbering in the tens of thousands, being generated as hits. As a result, finding the websites for the distribution servers 103 and 105 using a conventional search is extremely time consuming. The reference server 112 in the content distribution system of the present invention, however, finds which of the distribution servers 101 to 108 corresponds to the keyword by referring to the reference table that contains content management information for the distribution servers 101 to 108. This means that even if the keyword is a common word such as 'star', a large number of search results will not be generated.

The following is an explanation of the internal structure of the distribution servers 101 to 108. The distribution servers 101 to 108 have a functional structure like the one in FIG. 7. In the drawing, the distribution servers 101 to 108 each include a communication unit 20, a content/DES key storage unit 21, a playback rights purchase fee table (hereafter purchase fee table) 22, and a content packaging unit 23.

The communication unit 20 includes a LAN card, a modem, an ISDN terminal adaptor and the like, and transmits and receives data via the network.

The content/DES key storage unit 21 stores a plurality of music contents encoded using a specific encoding system, with corresponding DES (data encryption standard) keys for encrypting the music contents, and content IDs corresponding to the music contents. The content ID is a code unique to the music content, such as an ISRC (international standard recording code). A DES key is an encryption key used for encrypting and decrypting data according to the DES encryption system (In the DES encryption system, the same encryption key is used for both encryption and decryption of music contents).

The purchase fee table 22 lists a content ID for each music content, and corresponding purchase fees for the playback rights.

Figure 8:
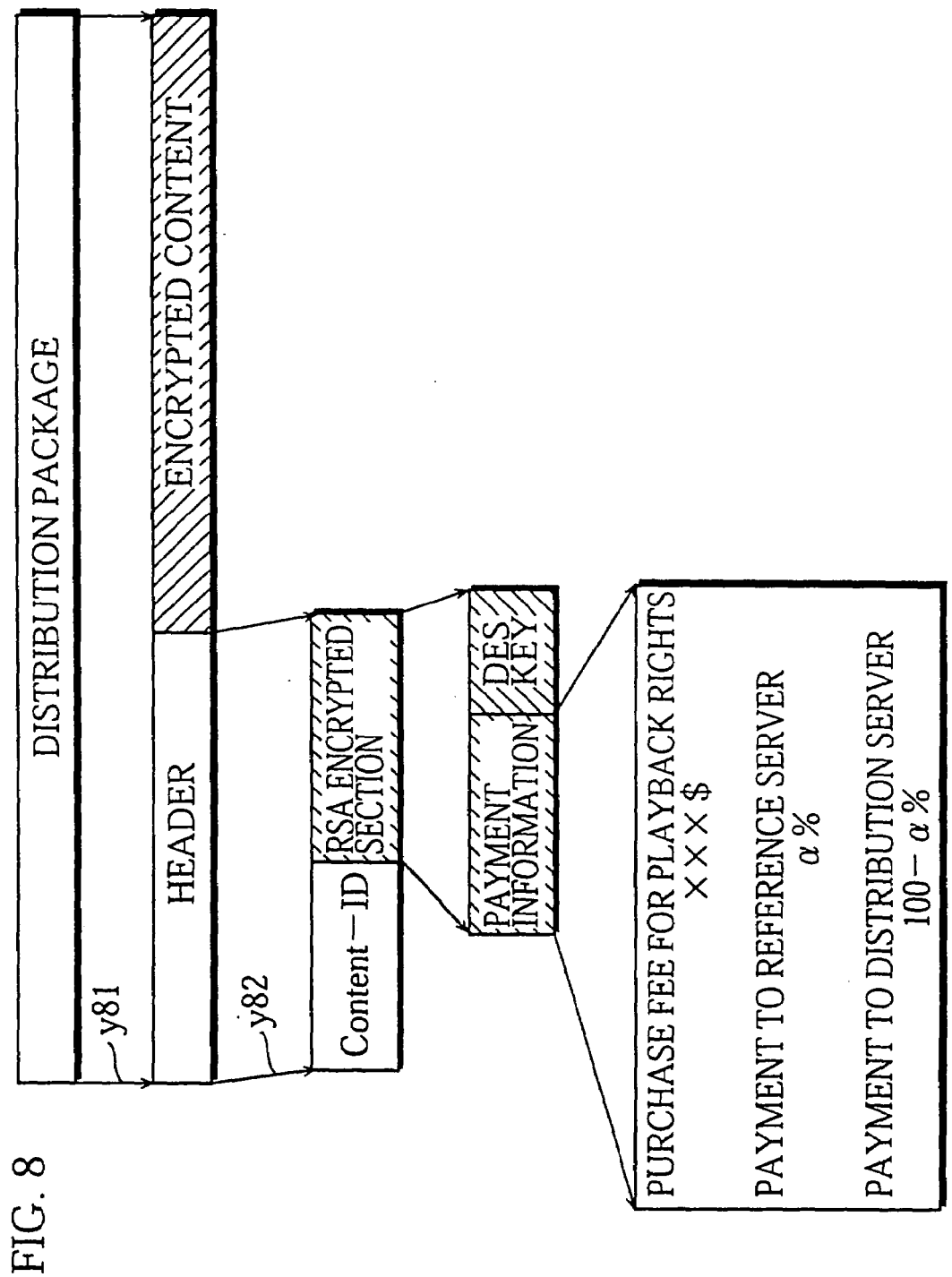
FIG. 8 shows a structure for a distribution package formed by a content packaging unit 23.

The content packaging unit 23 converts the music content into a distribution package format like the one shown in FIG. 8, upon receiving a purchasing request for a music content from the user terminal 109 via the Internet. FIG. 8 shows a structure for a distribution package generated by the content packaging unit 23. In the drawing, the distribution package is formed from a header and an encrypted content, as is indicated by the arrows y81, and the header is formed from a content ID and an RSA encrypted section (hereafter referred to as the RSA section), as indicated by the arrows y82.

The 'RSA section' contains data encrypted using the RSA encryption system, and as shown by the arrows y83, includes payment information, and a DES key. The Rivest, Shamir, Adleman (RSA) encryption system is a public key encryption system that is characterized by the use of different keys for encryption and decryption. Data encrypted by the RSA encryption system needs to be decrypted using a different decryption key from the public key used for encryption, and so the public key is regarded as being extremely secure.

In this embodiment, a decryption key for decrypting the encrypted data in the RSA section is distributed in advance to the user terminal 109 as part of the playback software. Only when the distribution package is downloaded by the user terminal 109, and the specified purchase fee for the playback rights paid, is the data in the RSA section of the distribution package decrypted.

The 'payment information' is information used to have the user operating user terminal 109 pay the purchase fee for the playback rights of the music content included in the distribution package. The content of the payment information differs according to whether or not it has been transmitted as via the reference server 112. If the user terminal 109 connects to one of the distribution servers 101 to 108 without going via the reference server 112, in other words accesses the distribution server without receiving a URL notification from the reference server 112, the payment information indicates to the user terminal 109 that the purchase fee for playback rights should be paid to the relevant distribution server 101 to 108.

When the user terminal 109 connects to the distribution server in question via the reference server 112, that is accesses the distribution server by receiving notification of an URL from the reference server 112, the payment information indicates to the user terminal 109 that α % of the purchase fee for the music content be paid to the reference server 112, and (100−α)% to the distribution server. When playback rights for a music content are purchased, α % of the purchase fee is a commission paid to the reference server 112 for having informed the user of the location of the distribution server.

Figure 9:
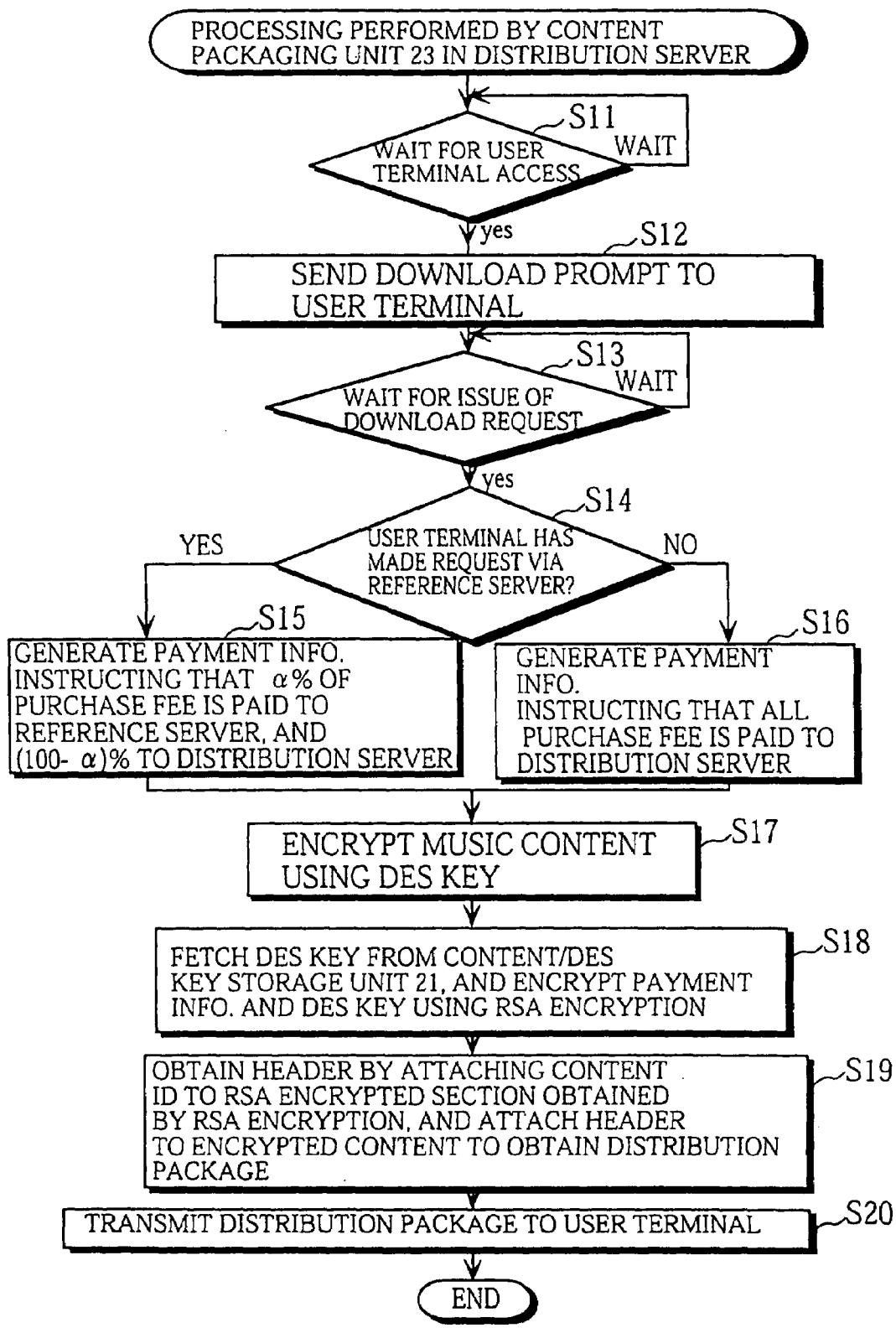
FIG. 9 is a flowchart showing processing performed by the content packaging unit 23.

The flowchart of FIG. 9 shows the detailed processing sequence that is performed from when a download request is received until generation of the distribution package shown in FIG. 8. The following is an explanation of the processing performed by the content packaging unit 23 with reference to the flowchart in FIG. 9. At step S11, the content packaging unit 23 waits for an access from the user terminal 109. Once an access is received, at step S12, the content packaging unit 23 transmits a download prompt to the user terminal 109. Following this, at step S13, the content packaging unit 23 waits for a download request to be issued, and if one is issued, at step S14, determines whether the user terminal 109 has made the request via the reference server 112.

If the user terminal 109 has not made the request via the reference server 112, at step S15, the content packaging unit 23 generates payment information instructing the user terminal 109 to pay the entire purchase fee for the music content playback rights to the relevant distribution server 101 to 108. Conversely, if the request was made via the reference server 112, the content packaging unit 23 generates payment information instructing the user terminal 108 to pay α % of the purchase fee to the reference server 112, and (100−α %)% to the relevant distribution server 101 to 108. Once the payment information has been generated, at step S17, the content packaging unit 23 encrypts the music content using the DES key. Following this, at step S18, the content packaging unit 23 fetches the DES key from the content/DES key storage unit 21, and encrypts the generated payment information and the DES key using RSA encryption.

At step S19, the content packaging unit 23 obtains a header by adding a content ID to the RSA section formed by performing RSA encryption, and adds the header to the encrypted content to obtain a distribution package. Following this, at step S20, the content packaging unit 23 transmits the distribution package to the user terminal 109.

Figure 10:
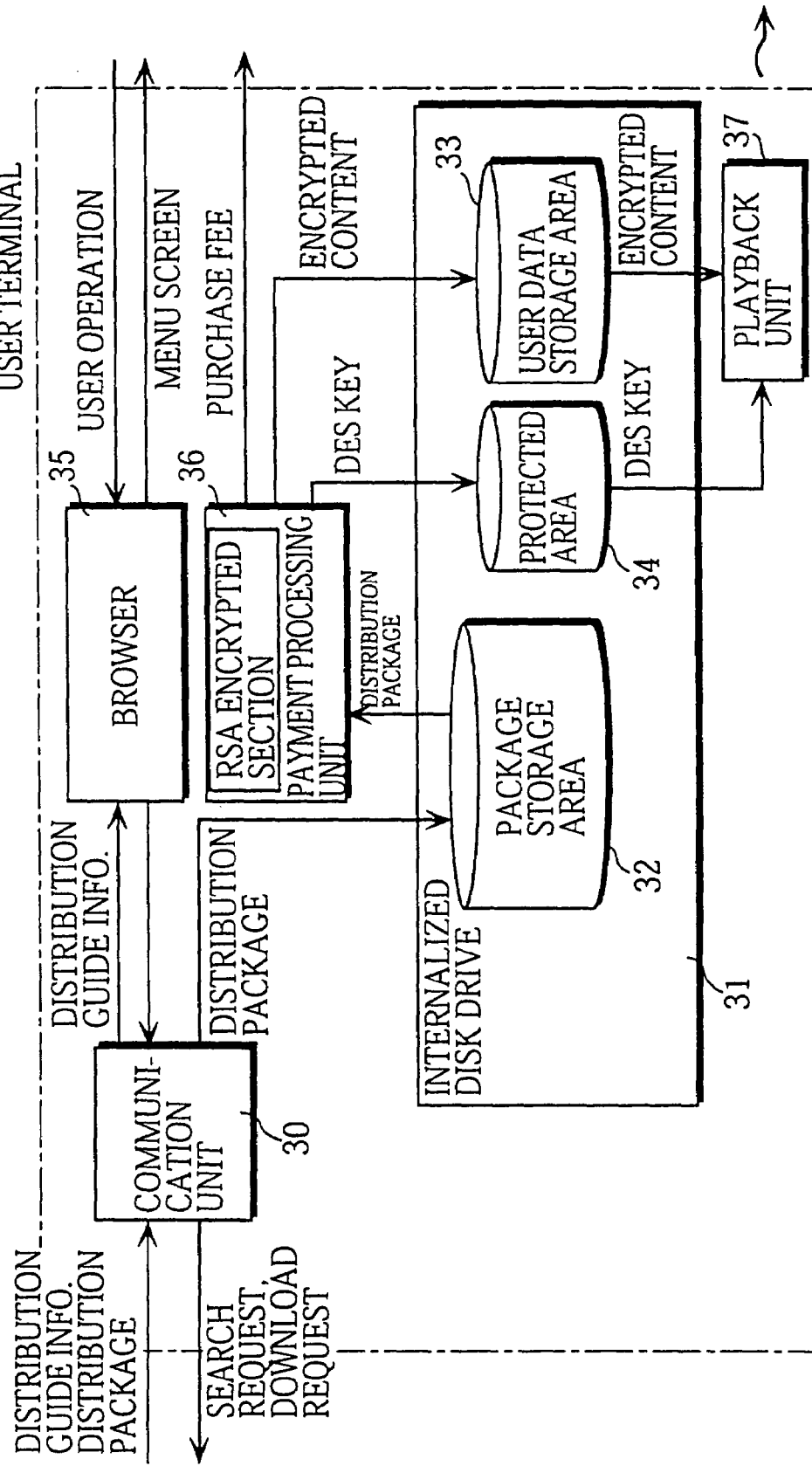
FIG. 10 shows an internal structure of a user terminal.

The following is an explanation of an internal structure of a user terminal 109, as shown in FIG. 10. In the drawing, the user terminal 109 includes a communication unit 30, a internalized disk drive 31, a browser 35, a purchase processing unit 36, and a playback unit 37.

The communication unit 30 includes a LAN card, a modem, an ISDN terminal adaptor, and the like, and transmits and receives data via the network.

The internalized disk drive 31 is formed from a hard disk or similar, and includes a package storage area 32, a user data storage area 33, and a protected area 34. The package storage area 32 stores a distribution package downloaded by the user terminal 109 from one of the distribution servers 101 to 108, linked to a corresponding piece of package management information. FIG. 11 shows examples of pieces of package management information stored in the package storage area 32. Each piece of package management information includes a unique index number (in the drawing numbers 1 to 7), a content ID contained in a corresponding distribution package (USMEI9900001, USMEI9903402, JPMEI9900001, etc in the drawing), and package storage location information (C:/package/Song1, C:/package/Song2, C:/package/Song3 . . . in the drawing) indicating a specific storage location of a corresponding distribution package.

The user data storage area 33 stores encrypted content included in those distribution packages stored in the package storage area 32 for which the user has purchased playback rights.

The protected area 34 stores data securely so that it cannot be tampered with by the user. The protected area 34 stores DES keys included in those distribution packages stored in the package storage area 32 for which the user has purchased playback rights, and a purchase information management table (described later in this specification).

When a distribution package has been downloaded, but the playback rights for the music content included in the distribution package have not been purchased, the distribution package is stored only in the package storage area 32, and the encrypted content and DES key are not stored in the user data storage area 33 and protected area 34. Once playback rights have been purchased, however, the encrypted content and DES key are stored respectively in the user data storage area 33 and protected area 34, as well as the distribution package being stored in the package storage area 32.

The distribution package, encrypted content, and DES key stored respectively in the package storage area 32, the user data storage area 33, and the protected area 34 are each managed as an individual file. Furthermore, the package storage area 32, the user data storage area 33, and the protected area 34 are realized as a subdirectory of the hard disk. The storage locations of the distribution package, the encrypted content, and the DES key in the package storage area 32, the user data storage area 33, and the protected area 34 are each specified as unique file paths in this subdirectory.

Figure 14:
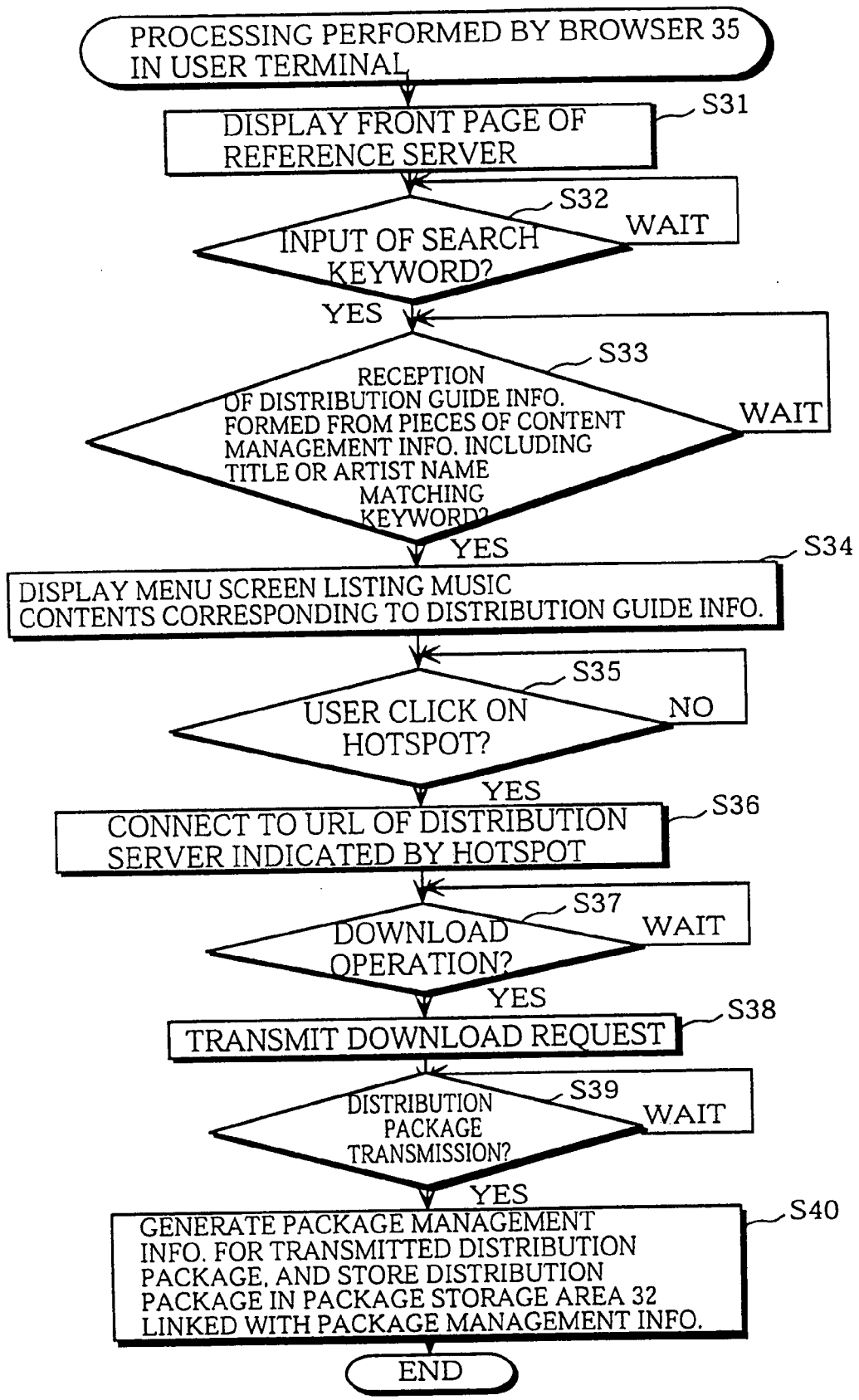
FIG. 14 is a flowchart showing processing performed by a browser 35 in the user terminal.

The browser 34 searches the reference table held in the reference server 112 (process d), accesses one of the distribution servers 101 to 108 using the distribution guide information (process e), and downloads a music content (process f). Detailed processing performed in processes d to f by the browser 35 is shown in the flowchart of FIG. 14. The following is a detailed explanation of this processing, with reference to the flowchart.

At step S31, the browser 35 displays a front page for the reference server 112, and at step S32, waits for a search keyword input to be made by the user. Once a keyword has been input, at step S33, the browser 35 waits to receive distribution guide information formed from pieces of content management information that include a title or artist name matching the keyword. Once the distribution guide information is received, at step S34, the browser 35 displays a menu screen showing a list of music contents corresponding to the distribution guide information. Once the list has been displayed, at step S35, the browser 35 waits for the user to click on a hotspot, and at step S36, connects to an URL for one of the distribution servers 101 to 108 that is indicated by the hotspot. At step S37, the browser 35 judges whether a download operation has been made by the user, and at step S38, transmits the download request. Following this, at step S39, the browser 35 waits for transmission of a distribution package. Once a distribution package has been transmitted, at step S40, the browser 35 generates a piece of package management information for the transmitted distribution package, and stores the distribution package in the package storage area 32, along with the corresponding piece of package management information.

The purchase processing unit 36 refers to pieces of package management information in the browser 35 to determine which of the distribution packages stored in the package storage area have been selected by the user (process g). Once a distribution package has been selected by the user, the purchase processing unit 36 determines whether the distribution package has already been purchased by referring to a corresponding purchase state in the purchase information management table stored in the protected area 34. If the distribution package has been purchased it can be played back. If not, the purchase processing unit 36 pays the necessary purchase fee by accessing the billing server 111 (process h). Following this, the purchase processing unit 36 sets the music content and the DES key so that the music content included in the distribution package can be played back by the playback unit 37 (process i).

Figure 13:
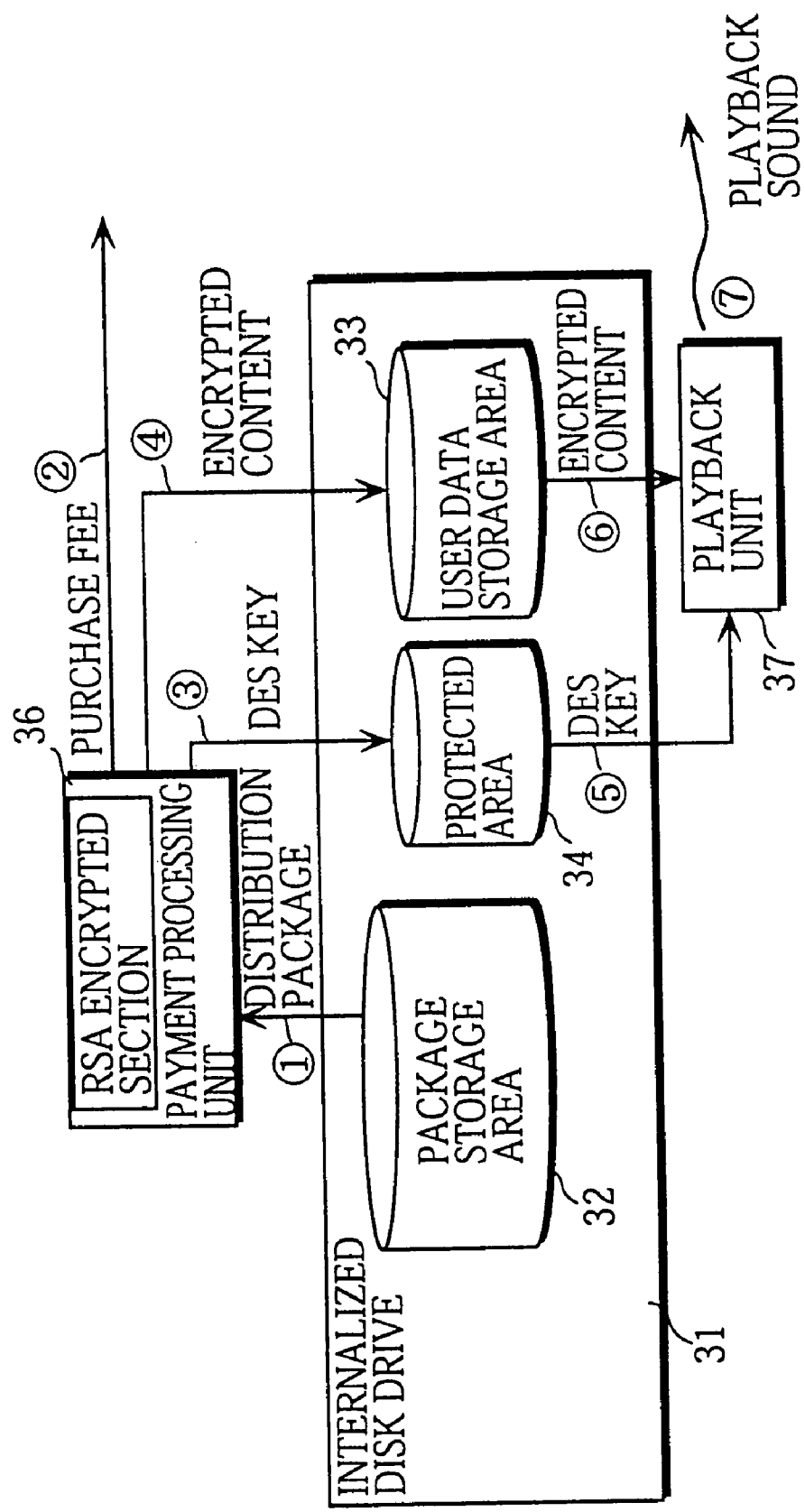
FIG. 13 illustrates input/output of data to and from the inside of the user terminal when playback rights are purchased.

The detailed processing sequence performed in processes g to i by the purchase processing unit 36 is explained with reference to the flowchart shown in FIG. 15. In order to provide additional information regarding processing performed by the purchase processing unit 36, the following explanation also refers to FIG. 13. FIG. 13 shows data input and output when playback rights are purchased. At step S51, the purchase processing unit 36 displays a list of packages stored in the package storage area 32, based on the pieces of package management information. At step S52, the purchase processing unit 36 receives a user selection of a music content whose playback rights are to be purchased. Once a music content has been selected, at step S57, the purchase processing unit 36 determines whether the purchase status of the music content is 'purchased' by referring to the purchase information management table. If the music content has been purchased, processing moves to step S56, and if not, to step S53.

At step S53, the purchase processing unit 36 fetches the distribution package corresponding to the selected music content (FIG. 13, ①). The purchase processing unit 36 decrypts the RSA section included in the distribution package, and obtains payment information and a DES key. At step S54, the purchase processing unit 36 pays the purchase fee for the playback rights to the billing server 111 (FIG. 13, ②). At step S55, the purchase processing unit 36 stores the DES key in the protected area 34 (FIG. 13, ③), and stores the encrypted content in the user data storage area 33 (FIG. 13, ④). Following this, at step S58, the purchase processing unit 36 sets the content as being 'purchased' in the purchase information management table. Then, at step S56, the purchase processing unit 36 has the DES key fetched from the protected area 34 (FIG. 13, ⑤), and the encrypted content fetched from the user data area 33 (FIG. 13, ⑥) and then has the music content played back (FIG. 13, ⑦).

As a result of the procedure of FIG. 14, the purchase processing unit 36 holds a purchase information management table like the one shown in FIG. 12, so as to manage music contents whose playback rights have been purchased separately from music contents whose playback rights have not been purchased. The purchase information management table shown in FIG. 12 includes index numbers, content storage location information, purchase status information, and key storage location information. Index numbers (1, 2, 3, 4, 5 . . . ) are given to each music content stored in the user terminal 109. Each piece of content storage location information (C:/AudioData/Song1, C:/AudioData/Song2, C:/AudioData/Song3, etc) is a file path to a storage location for a music content with a corresponding index number. Each piece of purchase status information (purchased, unpurchased) indicates whether the corresponding music content has been purchased. Each piece of key storage location information (C:/Key/Song1, C:/Key/Song2, C:/Key/Song3, etc) indicates a storage location for a decryption key for decrypting the music content with the corresponding index number. Once playback rights for a music content have been purchased, file paths showing the storage locations of the music content and the DES key are set in the content storage location information and the key storage location information of the corresponding payment management information. Furthermore, the purchase status information is set at 'purchased', indicating that the music content with the corresponding index number has been purchased. Once the above processing has been completed, the purchase of the music content is completed.

The playback unit 37 uses the DES key stored in the protected area 34 to decrypt the encrypted content stored in the user data storage area 33, obtaining digital audio data which it then plays back.

The input and output of data in the content distribution system is performed as shown in FIGS. 16 and 17 by having the reference server 112, the distribution servers 101 to 108, and the user terminal 109 perform the above processing. FIG. 16 shows the movement of data between servers and the user terminal 109, when the user terminal 109 downloads music contents via the reference server 112. FIG. 17 shows the movement of data between servers and the user terminal 109, when the user terminal 109 does not download music contents via the reference server 112.

One important point to note from FIGS. 16 and 17 is that processing is performed in the order shown by the numerical references ①, ②, ③A, and ④. If the user terminal 109 accesses the reference server 112, and the user makes a search request for music contents, the reference server 112 generates distribution guide information by performing the processing of the flowchart in FIG. 5 (FIG. 16, ①). Then, the reference server 112 transmits distribution guide information including an URL for the distribution server 103 back to the user terminal 109 (FIG. 16, ②).

If, having been informed of the URL for the distribution server 103, the user terminal 109 makes a download request for a music content to the distribution server 103, the content packaging unit 23 in the distribution server 103 performs the processing of the flowchart in FIG. 9 (FIG. 16, ③). At this point, determination of whether the user terminal 109 accessed the distribution server 103 via the reference server 112 is made (FIG. 16, ④). Here, the user terminal 109 accesses the distribution server 103 via the reference server 112, so payment information is generated set so that α % of the purchase fee for playback rights is paid to the reference server 112, and (100−α)% is paid to the distribution server 103 (FIG. 16, ⑤). Following this, a distribution package including the generated payment information is transmitted back to the user terminal 109 (FIG. 16, ⑥).

Figure 15:
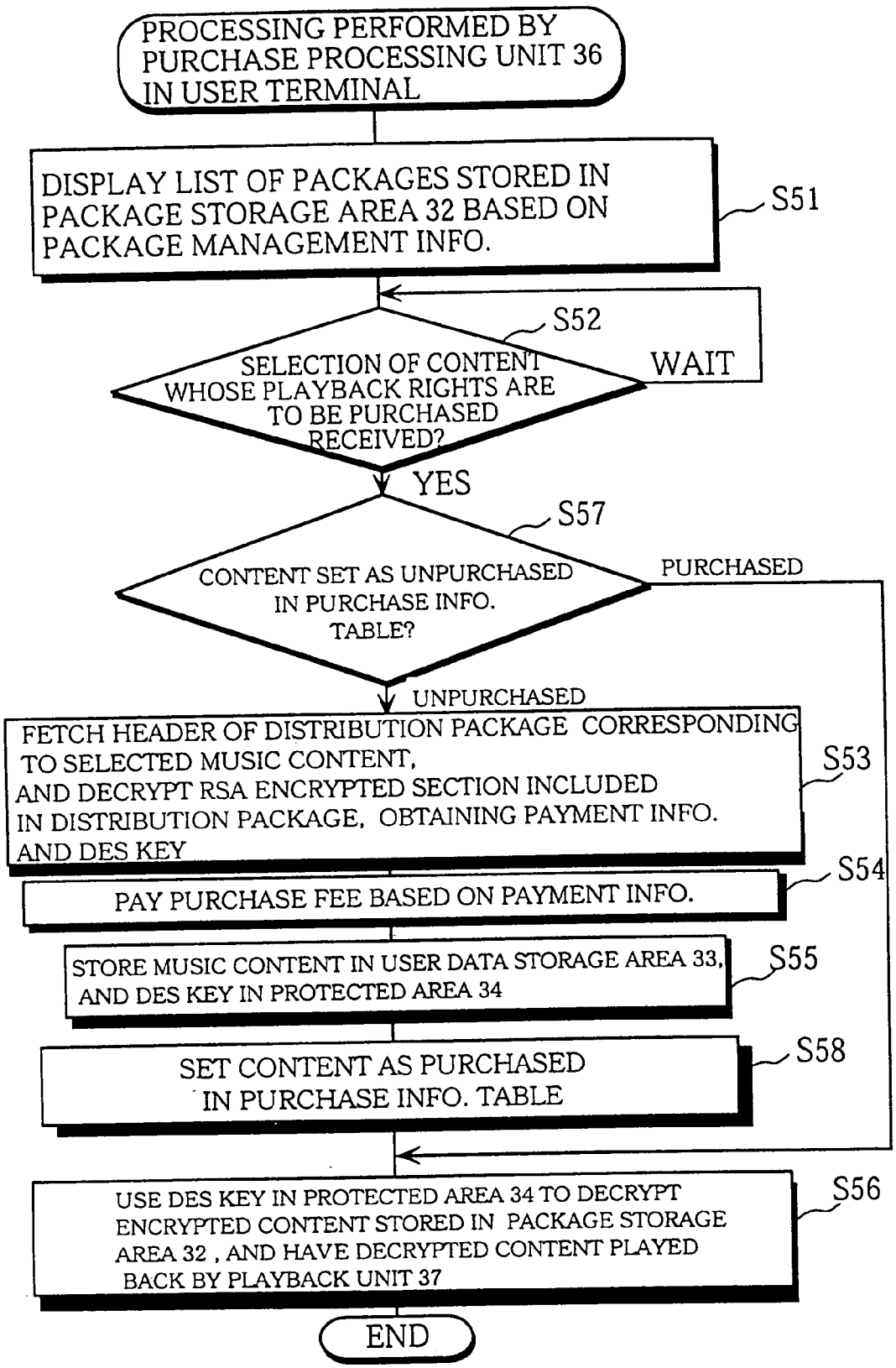
FIG. 15 is a flowchart showing processing performed by a purchase processing unit 36 in the user terminal.

Once the distribution package has been received, the purchase processing unit 36 in the user terminal 109 performs the processing shown in the flowchart of FIG. 15. Then, a payment of α % of the purchase fee is made to the reference server 112 and a payment of (100−α)% made to the distribution server 103 (FIG. 16, ⑦, ⑧).

If the user terminal 109 accesses the distribution server 103, and makes a request to download music contents, the content packaging unit 23 in the distribution server 103 performs the processing of the flowchart shown in FIG. 9 (FIG. 17, ①). At this point, determination of whether the user terminal 109 accesses the distribution server 103 via the reference server 109 is performed (FIG. 17, ①) . Here, the user terminal 109 does not access the distribution server 103 via the reference server 112, so payment information set so as to pay the entire purchase fee for the playback rights to the distribution server 103 is generated (FIG. 17, ③). Then, a distribution package including the payment information is transmitted to the user terminal 109 (FIG. 17, ④).

Having received the distribution package, the purchase processing unit 36 in the user terminal 109 performs the processing shown in the flowchart of FIG. 15. As a result, the entire purchase fee for the playback rights is paid to the distribution server 103 (FIG. 17, ⑤).

In this embodiment, when the distribution servers 101 to 108 are operated by independent artists, such artists are able to inform a large number of user terminals 109 of the music contents they have created, and the location of the distribution server used to distribute these music contents. Meanwhile, if the reference server 112 is operated by a major record company, the major record company can receive a portion of the payment made to purchase playback rights for a music content as commission, so independent artists and major record companies can share profits. If the two sides are able to preserve such an amicable partnership, it will be possible to supply music contents to a larger number of people worldwide.

Note that when a user issues a playback command in a case when the user terminal 109 is not provided with the user data storage area 33 and the protected area 34, this may be accomplished by decrypting the RSA encrypted section in the distribution package stored in the package storage area 32, and playing back the decrypted content. The playback processing is performed as follows. Once the user has selected a content, the user terminal 109 confirms whether it has been purchased by referring to the purchase status of the content. If the content has been purchased, the key distributed as part of the playback software is used to decrypt the RSA encrypted section. The DES key obtained as a result of this decryption is used to decrypt the content, which is then played back.

Note that, in the present embodiment, the processing for determining whether the user terminal accessed the distribution server via the reference server, and for generating payment information are performed by the distribution server, but this processing may alternatively be performed by the reference server or the billing server. In other words, when the distribution server is accessed by the user terminal, the reference server or the billing server determines whether the user terminal connected to the distribution server using a URL from the reference server as a connection target. If a connection was made without using such an URL, a piece of payment information indicating that payment should be made to the distribution server is generated. If connection was made using such an URL, however, a piece of payment information indicating that payment should be made to both the distribution server and the reference server is generated. The generated piece of payment information is then transmitted to the user terminal.

Second Embodiment

This embodiment describes an improvement relating to a situation in which a plurality of music contents obtained by encoding a single copyrighted material, but requiring different playback software, are stored by being divided up between distribution servers 101 to 108.

When a plurality of music contents that are versions of a same copyrighted material requiring different playback software are stored on a plurality of distribution servers 101 to 108, a user may end up downloading a version of the music content that is incompatible with the particular playback software installed in their user terminal 109, while remaining oblivious to the fact that a compatible version of the same music content is stored on a different distribution server 101 to 108.

In order to prevent the user from mistakenly downloading a version of the music content corresponding to an incompatible playback software, the search engine 12 in the second embodiment receives playback software information indicating the type of playback software installed in the user terminal 109 from the user terminal 109, as well as receiving a search keyword in the same way as in the first embodiment.

Having received the keyword and the playback software information, the search engine 12 specifies pieces of content management information in the reference table that include a title or artist name corresponding to the keyword. Then those of the specified pieces of content management information that have a same playback software information as the playback software information input from the user terminal 109 are further specified. The search engine 12 generates distribution guide information from the specified pieces of content management information, and transmits the generated distribution guide information to the user terminal 109.

In this embodiment, a user acquires only music contents in a format corresponding to a playback software that is installed in their own user terminal 109, even if a plurality of music contents that are versions of a same copyrighted material corresponding to different types of playback software are stored on a plurality of distribution servers 101 to 108.

Third Embodiment

Figure 18:
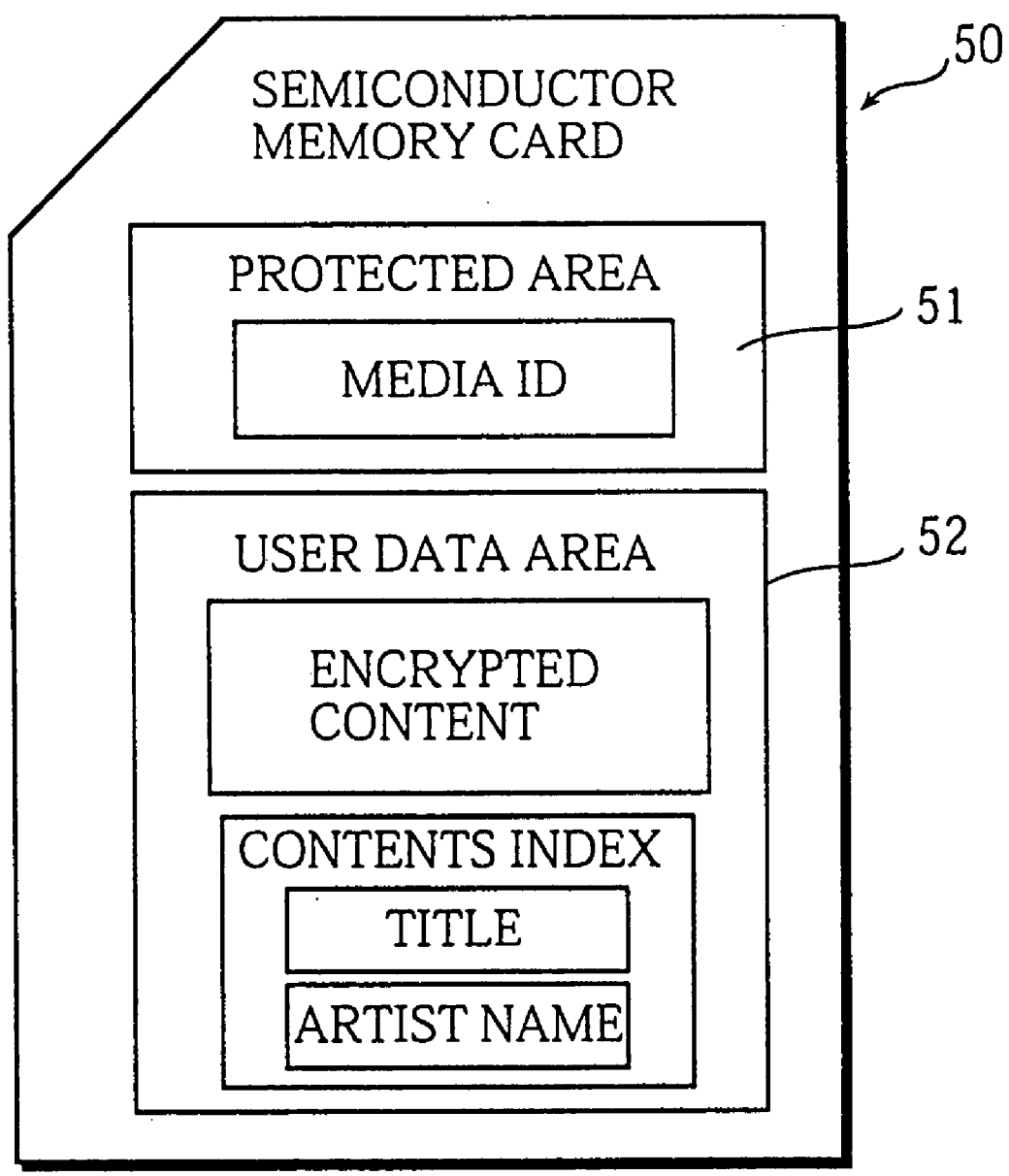
FIG. 18 shows a structure of a semiconductor memory card.

A third embodiment proposes recording, onto a semiconductor memory card, an encrypted content included in a distribution package downloaded from one of the distribution servers 101 to 108 by a user terminal 109, and transferring the encrypted content to another user terminal 109. The structure of the semiconductor memory card is shown in FIG. 18. In FIG. 18, a semiconductor memory card 50 includes a protected area 51 and a user data storage area 52.

The protected area 51 can be accessed by a device connected to the semiconductor memory card 50 only when the validity of the connected device has been confirmed, and stores a unique identifier (media-ID) for the semiconductor memory card 50.

The user data storage area 52 can be accessed by a connected device regardless of whether or not its validity has been confirmed, and stores encrypted contents and content-related phrases.

Figure 19:
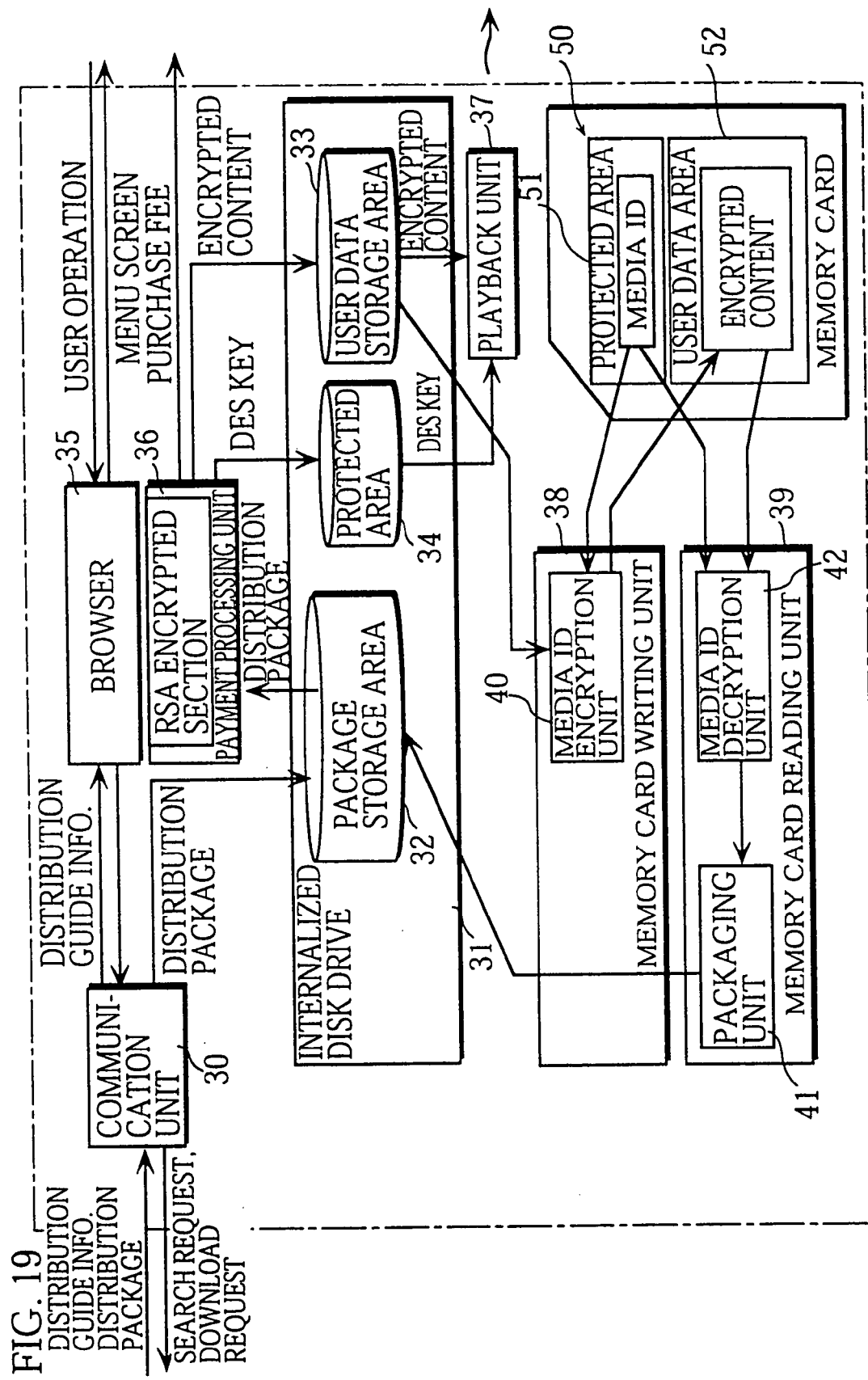
FIG. 19 shows an internal structure of a user terminal in a third embodiment.

FIG. 19 shows the internal structure of the user terminal 109 in the third embodiment. In the drawing, the user terminal 109 includes a memory card writing unit 38 that is used to record encrypted contents from distribution packages onto the semiconductor memory card 50. The user terminal 109 also includes a memory card reading unit 39 for converting encrypted contents stored on the semiconductor memory card 50 into distribution packages, and storing the resulting distribution packages in the package storage area 32. The memory card writing unit 38 includes a media-ID encryption unit 40, and the memory card reading unit 39 includes a packaging unit 41, and a media-ID decryption unit 42. In order to supplement the explanation of the processing performed by the media-ID encryption unit 40, the packaging unit 41, and the media-ID decryption unit 42, the following explanation refers to FIGS. 20 and 21.

Figure 20:
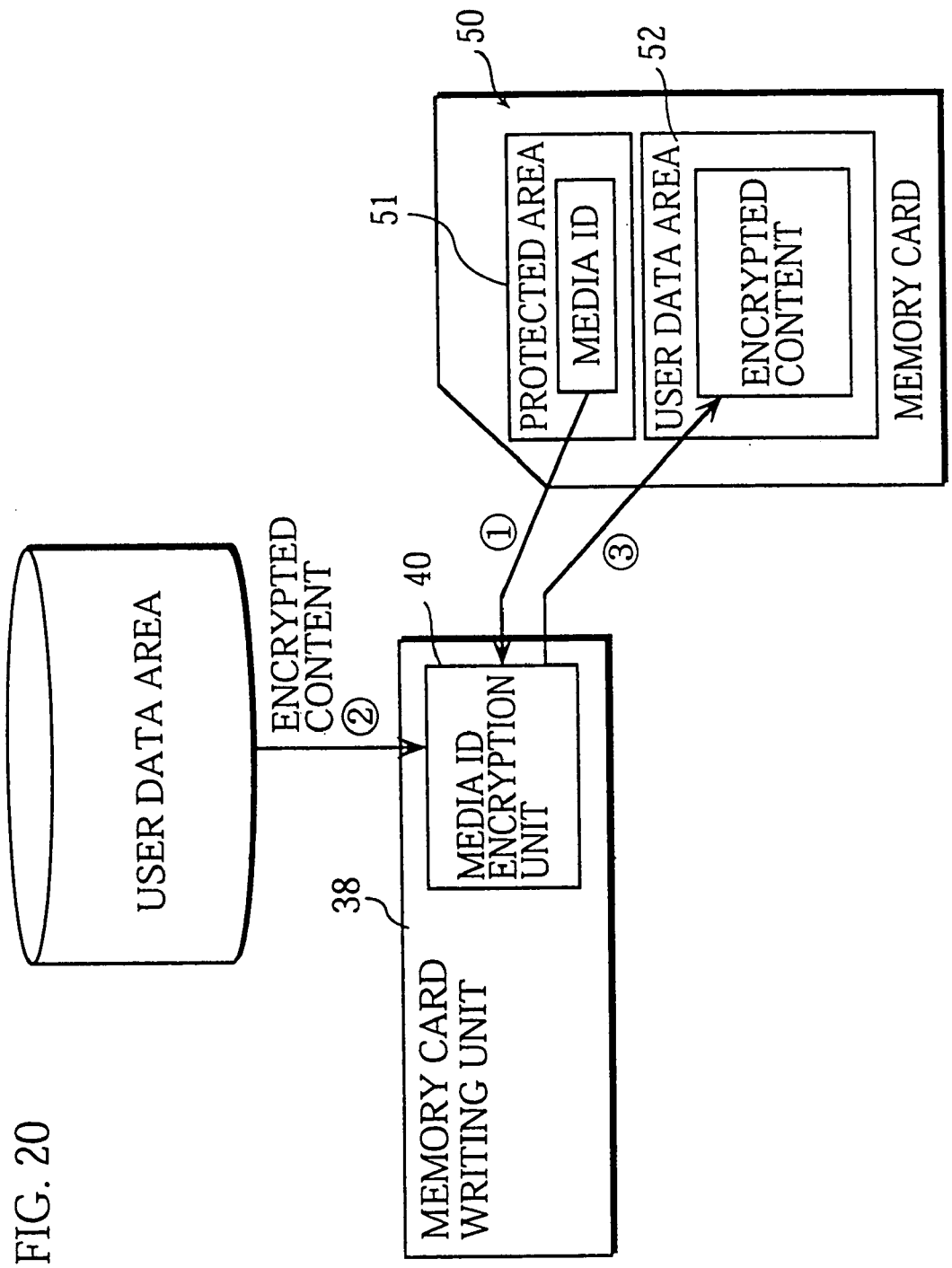
FIG. 20 supplements the explanation of processing performed by a media-ID encryption unit 40.

When the semiconductor memory card 50 is inserted into the user terminal 109, the media-ID encryption unit 40 fetches the media-ID from the protected area 51 (FIG. 20, ①), and an encrypted content from the user data storage area 33 (FIG. 20, ②). Then the media-ID encryption unit 40 generates a new encryption key by applying a calculation formula to the media-ID. As explained in the first embodiment, the encrypted content has already been encrypted using a DES key, so after being encrypted by the media-ID encryption unit 40, the music content will have been encrypted twice. After encrypting the encrypted content for the second time, the media-ID encryption unit 40 records the doubly encrypted content in the semiconductor card 50 together with a content-related phrase (described in the first embodiment) (FIG. 20, ③).

Figure 21:
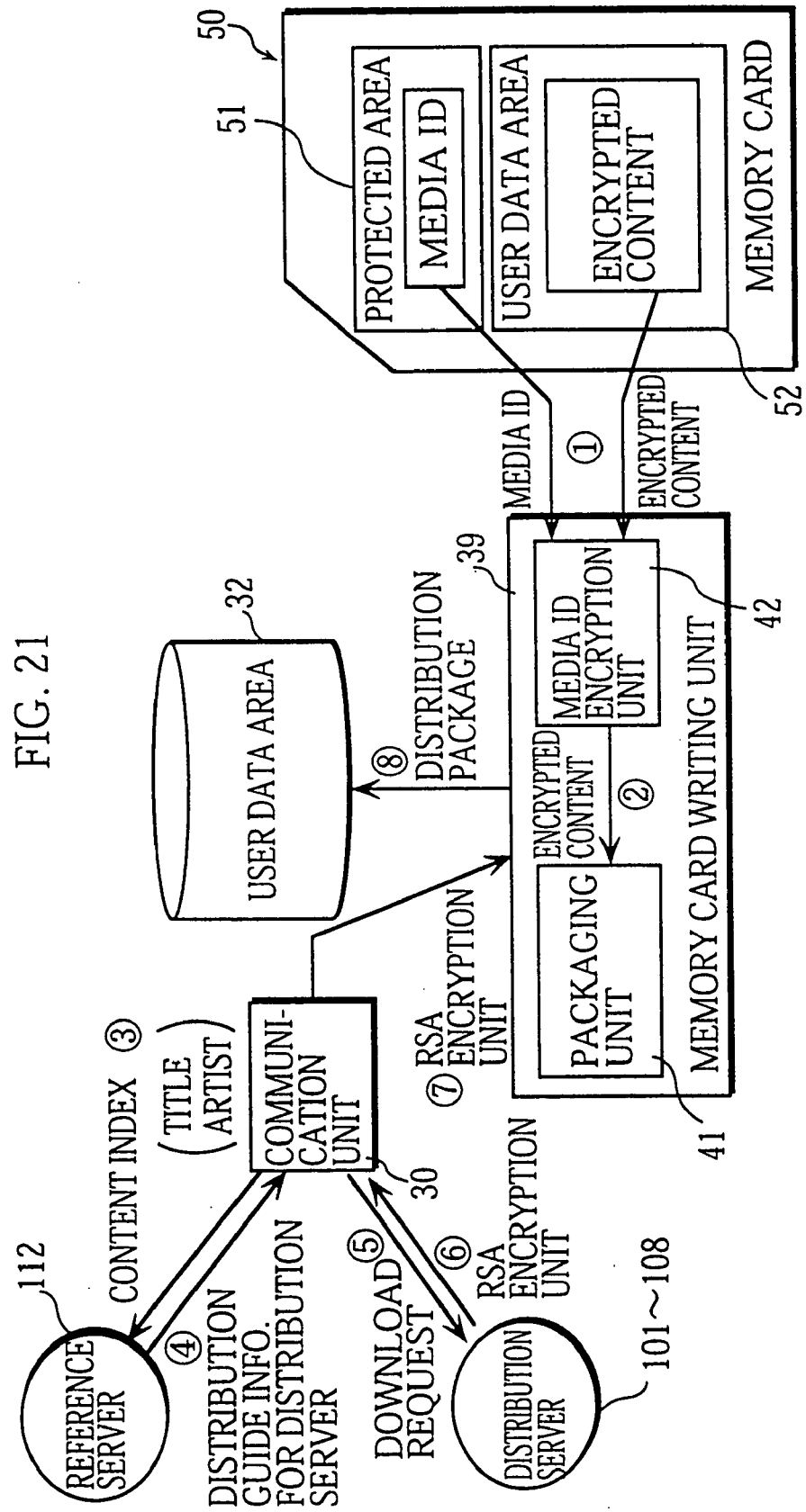
FIG. 21 supplements the explanation of processing performed by a packaging unit 41, and a media-ID decryption unit 42.

Once a semiconductor memory card 50, on which an encrypted content encrypted by the media-ID, and a content-related phrase have been recorded, is inserted into the user terminal 109, the media-ID decryption unit 42 fetches the media-ID from the protected area of the semiconductor memory card 50, and the encrypted content from the user data area 33 (FIG. 21, ①). Then, the media-ID decryption unit 42 generates a new encryption key by applying a certain calculation formula to the media-ID. The media decryption unit 42 decrypts the encrypted content using the encryption key, obtaining a encrypted content that has only been encrypted by the DES key (FIG. 21, ②).

When an encrypted content from the semiconductor memory card 50 has been stored in the user data storage area 33, the packaging unit 41 searches the reference table in the reference server 112 using the content-related phrase recorded in the user data storage area 52 in the semiconductor memory card 50 (FIG. 21, ③). As a result, the packaging unit 41 has distribution guide information, indicating the distribution server 101 to 108 from which the encrypted content was transmitted, transmitted to the reference server 112 (FIG. 21, ④). Once one of the distribution servers 101 to 108 has been specified by referring to the distribution guide information, the packaging unit 41 requests the specified distribution server 101 to 108 for download of payment information and a DES key (FIG. 21, ⑤). The distribution server 101 to 108 from which a download has been requested, fetches payment information and the DES key, generates an RSA section including the fetched payment information and DES key, and transmits the generated RSA section to the user terminal 109 (FIG. 21, ⑥).

Once the RSA section is transmitted from one of the distribution servers 101 to 108, and received by the communication unit 30 (FIG. 21, ⑦), the packaging unit 41 links the encrypted content fetched from the user data storage area 52 in the semiconductor memory card 50 with the payment information and the DES key, and stores the linked data in the package storage area 32 as a single distribution package (FIG. 21, ⑧).

Once a music content stored on the semiconductor memory card 50 has been stored as a distribution package in the package storage area 32, the purchase processing unit 36 receives a purchasing request from the user. Then, the purchase processing unit 36 controls the billing server 111 to perform payment based on the payment information included in the purchasing request. This enables payment of the purchase fee for the playback rights of the music content to be made.

In this embodiment, distribution packages downloaded from one of the distribution servers 101 and 108 can be transferred between user terminals 109.

Note that, as an alternative when a distribution package is written to the semiconductor memory card, only the RSA encrypted section, including the content key and the payment information, need be encrypted by an encryption key based on the media-ID, and recorded in the protected area 51.

Fourth Embodiment

As shown in the first embodiment, audio formats such as Liquid Audio and a 2b each have their own individual audio compression codec and rights management system, and the various formats are rarely compatible with each other. This state of affairs is not beneficial for the user. When a user having a user terminal 109 equipped with Liquid Audio software wishes to purchase a content that is sold in, for example, a 2b format, the user has no alternative but to install an a 2b audio player in addition to the Liquid Audio player. In the future, the many types of SDMI-compatible audio playback software that are now being unveiled are likely to be incompatible in the same way as is the case at present with Liquid Audio and a 2b. This means that downloading music contents in a plurality of audio formats requires that the user install an equivalent number of audio players. As a result, a large part of the memory of the internalized disk drive 31 in the user terminal 109 will be occupied by the plurality of audio players.

In order to overcome such problems, the reference server 112 and the user terminal 109 in the fourth embodiment implement the following improvements.

As was explained in the first embodiment, each piece of content management information includes playback software information indicating a playback software that corresponds to a music content distributed by one of the distribution servers 101 to 108. Meanwhile, the content management information of the fourth embodiment indicates an URL of a playback software supply server 110.

Figure 22:
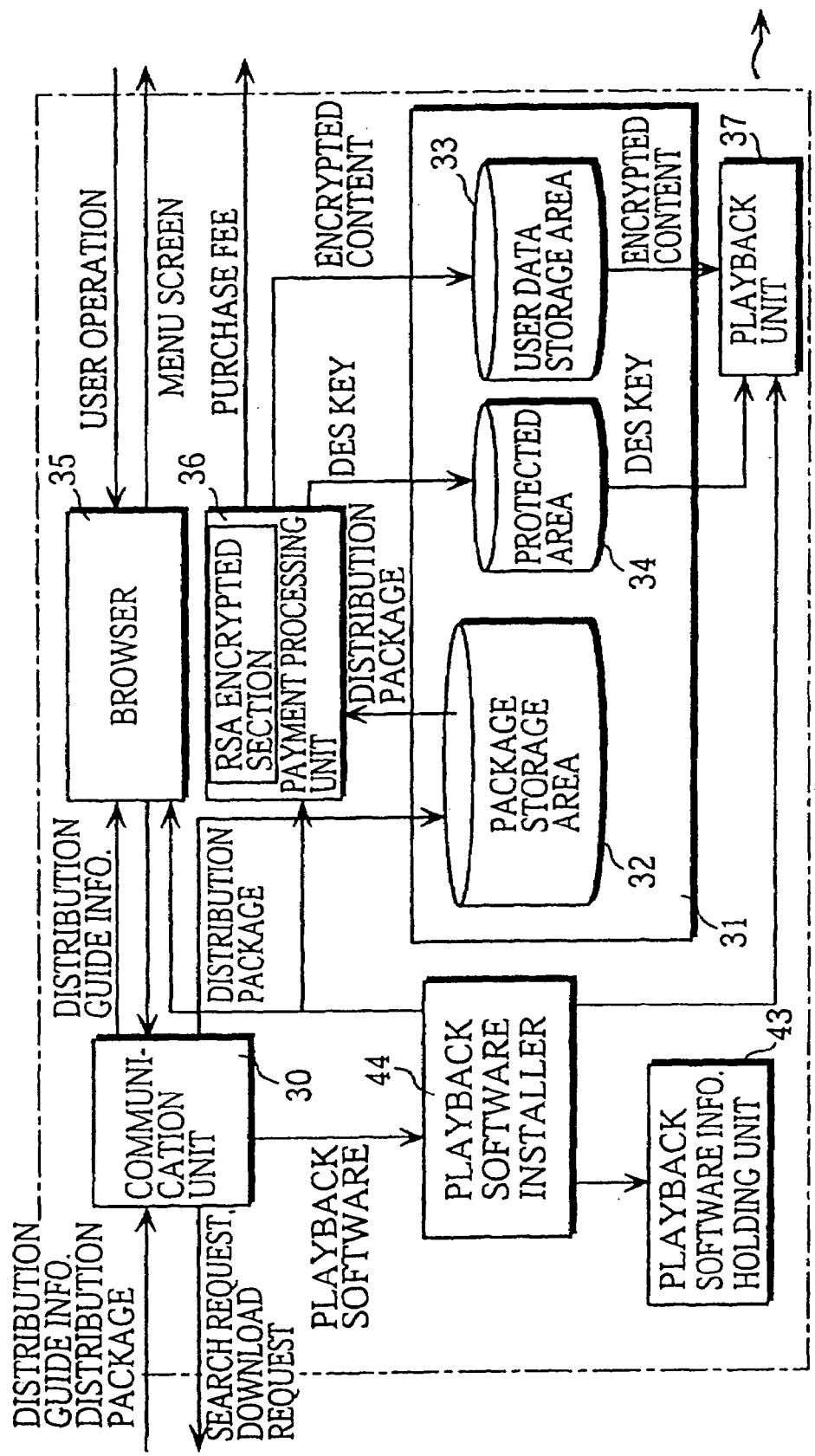
FIG. 22 shows an internal structure of a user terminal in a fourth embodiment.

The following is an explanation of an internal structure for the user terminal 109 in the fourth embodiment, with reference to FIG. 22. If the user terminal 109 in the fourth embodiment is compared with the user terminal 109 in the first embodiment, it can be seen that a playback software information holding unit 43, and a playback software installer 44 have been additionally provided.

The playback software information holding unit 43 holds playback software information indicating the type of playback software installed in the user terminal 109.

When a distribution package is downloaded from one of the distribution servers 101 to 108, and stored in the package storage area 32, the playback software installer 44 obtains playback software corresponding to this distribution package by referring to the URL for one of the distribution servers 101 to 108 indicated in the relevant piece of content management information. To be more precise, once distribution guide information has been transmitted from the reference server 112, and a hotspot for a piece of content management information included in the distribution guide information has been selected by the user, the playback installer 44 saves the piece of content management information. If a distribution package is downloaded based on this piece of content management information, and the user purchases the music content included in the distribution package, the playback installer 44 compares the playback software information corresponding to the music content with the playback software information held in the playback software information holding unit 43. If the two pieces of playback software information match, the user terminal 109 purchases the playback rights for the music content, and plays it back using the processing described in the first embodiment. If the pieces of playback software information do not match, however, the playback installer 44 requests download of playback software from a playback software supply server 110, based on an URL for the playback software supply server 110 included in the relevant piece of content management information. The necessary playback software is then downloaded from the playback software supply server 110. Once this has occurred, the user purchases the playback rights and plays back the music content.

As a result, a new piece of playback software is installed, in addition to those already installed in the user terminal. Such installation of new playback software is repeated as necessary. However, should the number of pieces of playback software installed in the user terminal 109 exceed a certain number, the playback installer 44 deletes one of the installed plurality of pieces of software. This ensures that the number of pieces of playback software is restricted to a low level.

When an installed piece of playback software needs to be deleted, deletion should preferably be performed according to one of the following criteria.

(a) A piece of software with the least recent installation date.
(b) A piece of software that has been used for the fewest playbacks.
(c) A piece of software for which no corresponding contents are stored in the user terminal.

In this embodiment, if music contents obtained from each of the various distribution servers 101 to 108 correspond to a different playback software, the corresponding playback software can be downloaded as required, and if the number of pieces of playback software exceed a specific number, already installed pieces of playback software are deleted as necessary. As a result, the number of pieces of playback software installed in the user terminal 109 can be restricted.

In this embodiment, if the audio format of a music content whose playback rights are about to be purchased by the user does not correspond to one of the pieces of playback software already installed in the user terminal 108, one of the already installed pieces of audio software may be overwritten with software corresponding to the newly purchased music content.

Fifth Embodiment

Figure 23:
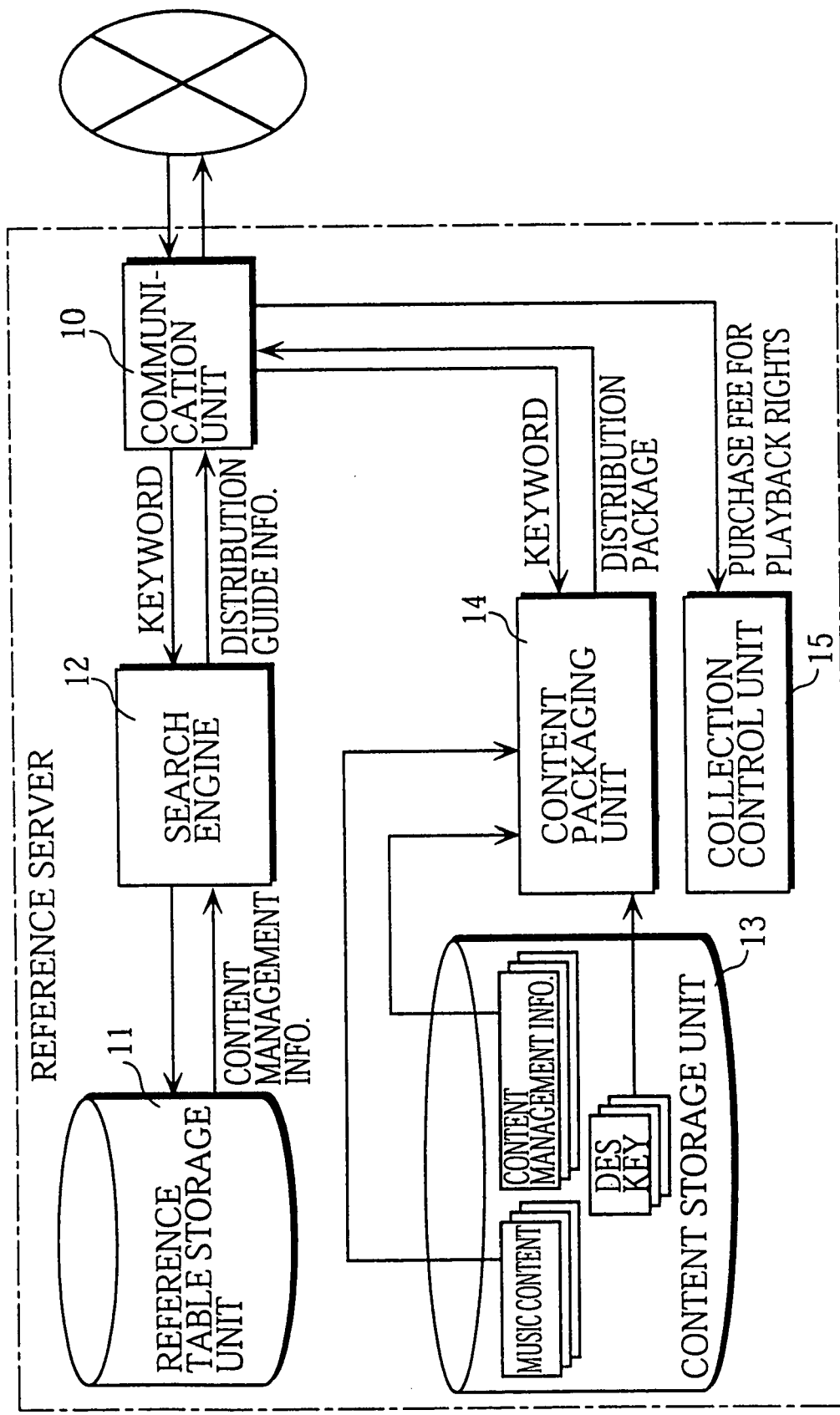
FIG. 23 shows an internal structure of a user terminal in a fifth embodiment.

In the first embodiment, transmission of music contents and billing processing related to the purchase of playback rights for music contents are performed by the distribution servers 101 to 108. A fifth embodiment, however, proposes that these processes be performed instead by the reference server 112. In order to realize transmission and sales processing, the reference server 112 has an internal structure as shown in FIG. 23. If the internal structure of this drawing is compared with the internal structure of the reference server 112 in the first embodiment, it is clear that a content storage unit 13, a content packaging unit 14, and a collection control unit 15 have been added.

The content storage unit 13 stores a plurality of music contents, DES keys used to encrypt the music contents, and pieces of content management information corresponding to each music content.

The content packaging unit 14, having received a keyword input from the user terminal 109, determines whether a piece of content management information including a title or artist name that matches the keyword either wholly or partially is stored in the content storage unit 13. If a matching piece of content management information is stored in the content storage unit 13, the content packaging unit 14 reads the piece of content management information and a corresponding DES key from the content storage unit 13, and encrypts the corresponding music content using the DES key. Once the music content has been encrypted, the content packaging unit 14 fetches the playback fee for the music content from the corresponding content management information, and generates payment information instructing the user terminal 109 to pay the purchase fee for playback rights. Once the payment information has been generated, the content packaging unit 14 encrypts it, paired with the DES key, using RSA encryption, and obtains a header by attaching a content ID. Once the header has been obtained as above, the content packaging unit 14 attaches it to the encrypted content to obtain a distribution package, and transmits the distribution package to the user terminal 109.

The collection control unit 15 determines whether the payment fee for the playback rights has been received from the user terminal 109 by referring to the payment information in the distribution package, and if so, collects α % of the purchase fee as commission for selling the music content. The collection payment fee then pays the remaining (100−α)% of the purchase fee to the owner of the copyright for the music content.

In this embodiment, the reference server 112 performs transmission of music contents and billing processing related to purchase of playback rights. As a result, independent artists who find it difficult to operate a distribution server 101 to 108 will still be able to start up an EMD business.

Sixth Embodiment

Figure 24:
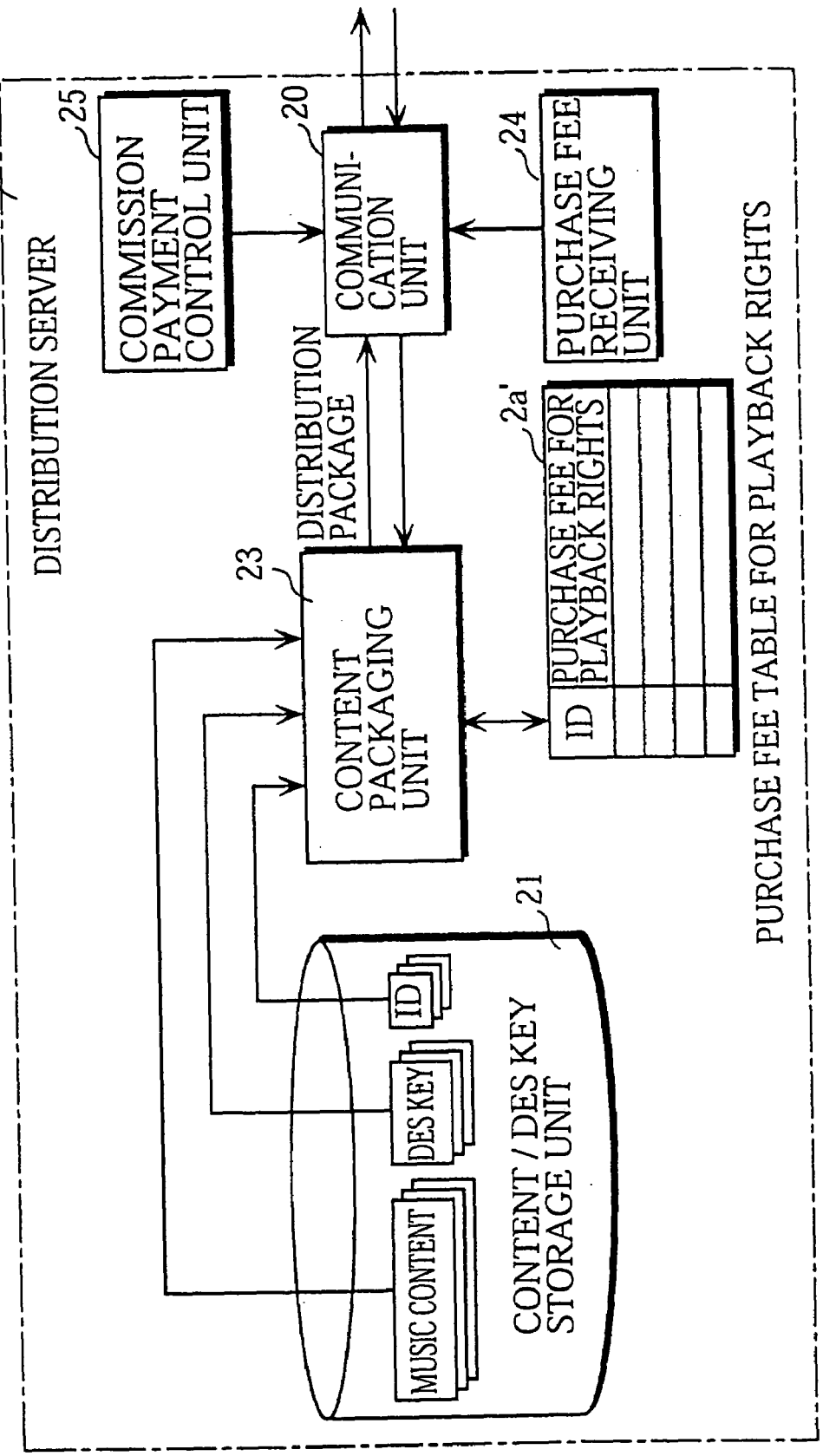
FIG. 24 shows an internal structure of a distribution server in a sixth embodiment.

In the first to fifth embodiments, payment is made when the playback rights for the music content are purchased. A sixth embodiment describes an improvement in which payment is made when the music content is downloaded from one of the distribution servers 101 to 108. FIG. 24 shows an internal structure for a distribution server in the sixth embodiment.

In FIG. 24, it can be seen that the distribution server in the sixth embodiment has been additionally provided with a purchase fee receiving unit 24, and a commission paying control unit 25.

The purchase fee receiving unit 24, when the distribution server is accessed by the user terminal 109, transmits a request for payment of the music content purchase fee to the user terminal 109. Once the purchase fee for the music content has been paid, the purchase fee receiving unit 24 has the content packaging unit 23 generate a distribution package through the same procedure as in the first embodiment, and transmits the distribution package to the user terminal 109. If the user terminal does not pay the purchase fee, the purchase fee receiving unit 24 does not have the content packaging unit 23 generate a distribution package.

If the user terminal 109 pays the purchase fee for the music content, the commission payment control unit 25 determines whether the user terminal 109 has made an access via the reference server 112. If so, the commission payment control unit 25 performs payment control to have α % of the purchase fee paid to the reference server 112 as commission for informing the user of the location of the distribution server.

In this embodiment, the purchase fee for the distribution package is received before the distribution package is transmitted. Consequently, unnecessary transmission of distribution packages to user terminals 109 whose owners have no intention of paying the purchase fee can be avoided.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

When the present invention is used, sales of copyrighted materials can be performed between the distribution servers 101 to 108, the reference server 112, the billing server 111, and user terminals 109. As a result, the distribution costs and stock management required for sales of copyrighted materials can be greatly reduced. Furthermore, users can purchase copyrighted materials via the network without needing to travel to a store. This is expected to provide reduced prices and other benefits, enabling present distribution channels to be greatly improved. For these reasons, the content distribution system of the present invention possesses high industrial applicability.

The invention claimed is:

1. A content distribution system including at least one distribution server for distributing digital contents via a network in response to requests from user terminals, said content distribution system comprising:
   a reference server operable to hold at least one piece of location information showing a location of a distribution server on the network, and to transmit one of the pieces of location information to one of the user terminals in response to a user request,
   wherein each distribution server includes:
   a receiving unit operable to receive a purchase fee for a digital content from one of the user terminals when said distribution server is accessed by the user terminal;
   a transmission unit operable to transmit the digital content to the user terminal if payment has been made;
   a determining unit operable to determine, when said distribution server is accessed by the user terminal, whether or not the user terminal has connected to said distribution server by using a piece of location information received from said reference server as a connection target; and
   a payment unit operable to pay a predetermined percentage of a purchase fee for the digital content to said reference server as a commission for providing the location of said distribution server to the user terminal, when the user terminal is determined by said determining unit to have connected to said distribution server by using the piece of location information received from said reference server.

2. The content distribution system of claim 1, including a plurality of distribution servers, wherein said reference server includes:
   a first storage unit operable to store a plurality of pieces of location information, each showing a location of one of said plurality of distribution servers, in correspondence with content-related phrases, each relating to a digital content transmitted by each respective distribution server;
   a receiving unit operable to receive a keyword input from the user terminal when the user terminal performs an access; and
   a search unit operable to search for at least one piece of location information with a content-related phrase partially or wholly matching the keyword input, and output the matching at least one piece of location information to the user terminal.

3. The content distribution system of claim 2, wherein:
   said first storage unit is further operable to store a plurality of pieces of content sales information in correspondence with content-related phrases for each digital content, each piece of content sales information showing, for each digital content, one of an encoding method, a playback quality, and a purchase fee for playback rights;
   said reference server further includes a distribution guide generation unit operable to fetch, if said search unit has found content-related phrases matching the keyword, pieces of content sales information corresponding to the content-related phrases, and to generate distribution guide information from the pieces of content sales information; and
   said search unit is operable to transmit the generated distribution guide information to the user terminal in correspondence with pieces of location information for distribution servers transmitting corresponding digital contents.

4. The content distribution system of claim 2, wherein:
   said first storage unit is further operable to store pieces of playback software information, each showing playback software for playing back a digital content, in correspondence with location information for each distribution server transmitting the digital content;
   said receiving unit is operable to receive, from the user terminal, a piece of playback software information indicating a playback software used by the user terminal, together with a keyword specifying the digital content; and
   said search unit is operable to inform the user terminal, when a plurality of content-related phrases matching the keyword exist, of only the content-related phrases with a corresponding piece of playback software information matching the piece of playback software information generated by the user terminal.

5. The content distribution system of claim 2, wherein said reference server further includes:
   a second storage unit operable to store a plurality of digital contents in correspondence with content-related phrases;
   a determining unit operable to determine whether a keyword input received from the user terminal partially or wholly matches a content-related phrase stored in said second storage unit;
   a reading unit operable to read, when said determining unit determines that a matching content-related phrase exists, a digital content corresponding to the matching content-related phrase from the plurality of digital contents stored in said second storage unit;
   a generating unit operable to generate a piece of payment information instructing a user terminal to pay a purchase fee to said reference server when the matching related phrase exists; and
   a transmitting unit operable to transmit the read digital content and the generated piece of payment information to the user terminal; and
   wherein, when the matching related phrase cannot be found in said second storage unit, said search unit is operable to inform the user terminal of a piece of location information stored in said first storage unit that has a content-related phrase partially or wholly matching the keyword.

6. The content distribution system of claim 5, wherein the reference server further includes a collection unit operable to collect a sales commission from a purchase fee for playback rights for a digital content paid to said reference server by the user terminal, and to pay a remainder of the purchase fee to an owner of the digital content, in accordance with the piece of payment information.

7. The content distribution system of claim 5, wherein the reference server further includes a collection unit operable to collect $\alpha$ % of a purchase fee for playback rights for a digital content paid to said reference server by the user terminal, and to pay $(100-\alpha)$ % of the purchase fee to an owner of the digital content, in accordance with the piece of payment information.

8. A content distribution system comprising:
a plurality of distribution servers operable to store a plurality of digital contents that are encoded versions of a same copyrighted material corresponding to different types of playback software, each version being stored in a different distribution server, and to transmit a stored digital content to a user terminal in response to a user request;
a user terminal, in which one type of playback software has been installed, operable to play back digital contents by using the installed playback software; and
a reference server operable to hold pieces of content management information showing which distribution server stores digital contents corresponding to each type of playback software, and to inform the user terminal which distribution server stores digital contents corresponding to the type of playback software installed in the user terminal, in response to a user request,
wherein each of said plurality of distribution servers includes:
a receiving unit operable to receive a purchase fee for a digital content from one of the user terminals when said distribution server is accessed by the user terminal;
a determining unit operable to determine, when said distribution server is accessed by the user terminal, whether or not the user terminal has connected to said distribution server by using a piece of content management information received from said reference server as a connection target; and
a payment unit operable to pay a predetermined percentage of a purchase fee for the digital content to said reference server as a commission for providing the location of said distribution server to the user terminal, when the user terminal is determined by said determining unit to have connected to said distribution server by using the piece of content management information received from said reference server.

9. A reference server in a content distribution system that includes a plurality of distribution servers for distributing digital contents via a network in response to requests from user terminals, said reference server comprising:
a storage unit operable to store a plurality of pieces of content management information, each piece of content management information including (1) location information showing a location on the network of one of the plurality of distribution servers, and (2) a content-related phrase relating to a digital content transmitted by one of the plurality of distribution servers;
a fetching unit operable to fetch from said storage unit all pieces of content management information containing a content-related phrase that partially or wholly matches a keyword received from a user terminal;
a distribution guide information generating unit operable to generate distribution guide information prompting a user to make a purchase, by using the pieces of content management information fetched from said storage unit; and
a receiving unit operable to receive, from a specific one of the plurality of distribution servers, a predetermined percentage of a purchase fee for a digital content as a commission for providing the location of the specific distribution server to the user terminal, if the user terminal has purchased the digital content from the specific distribution server by using the distribution guide information.

10. A content distribution system comprising:
a plurality of distribution servers, each operable to store a plurality of digital contents corresponding to a different type of playback software;
a playback software supply server operable to hold a plurality of types of playback software;
a reference server operable to store in correspondence (1) pieces of location information each showing a location of one of said plurality of distribution servers, (2) content-related phrases each relating to a digital content transmitted by one of said plurality of distribution servers, and (3) playback software information showing a type of playback software corresponding to the digital content;
a user terminal, in which at least one type of playback software is installed, operable to playback digital contents by using the installed playback software;
wherein said user terminal includes:
a receiving unit operable to receive a user selection, selecting a digital content with a content-related phrase that is stored in said reference server;
a download unit operable to download the digital content selected by the user selection by accessing one of said plurality of distribution servers based on a piece of location information corresponding to the content-related phrase for the digital content; and
an installing unit operable to determine whether the type of playback software corresponding to the digital content is installed in said user terminal, and if the corresponding type of playback software is not installed, to download the corresponding type of playback software from said playback software supply server, and to install the downloaded playback software; wherein each of said plurality of distribution servers includes:
a receiving unit operable to receive a purchase fee for a digital content from said user terminal, when said distribution server is accessed by said user terminal;
a determining unit operable to determine, when the distribution server is accessed by said user terminal, whether or not said user terminal has connected to said distribution server by using a piece of location information received from said reference server as a connection target; and
a payment unit operable to pay a predetermined percentage of a purchase fee for the digital content to said reference server as a commission for providing the location of said distribution server to said user terminal, when said user terminal is determined by said determining unit to have connected to said distribution server by using the piece of information received from said reference server.

11. A content distribution system including at least one distribution server for distributing digital contents via a network in response to requests from user terminals, said content distribution system comprising:
a reference server operable to hold at least one piece of location information showing a location of one of said at least one distribution server on the network, and to transmit one of the pieces of location information to one of the user terminals in response to a user request, wherein:
said distribution server is operable to transmit a digital content to one of the user terminals; and said reference server includes:
 a determining unit operable to determine, when said distribution server is accessed by the user terminals, whether the user terminal has connected to said distribution server by using one of the at least one pieces of location information received from said reference server as a connection target;
 a generating unit operable to generate
  (1) a piece of first payment information instructing the user terminal to pay a purchase fee to the distribution server, when the user terminal is determined by said determining unit to have connected without receiving the piece of location information from said reference server, and
  (2) a piece of second payment information instructing the user terminal to pay a predetermined percentage of a purchase fee to said reference server as a commission for providing the location of said distribution server to the user terminal, and to pay a remainder of the purchase fee to said reference server, when the user terminal is determined by said determining unit to have connected by using the piece of location information received from said reference server; and
 a transmitting unit operable to transmit one of the generated pieces of first and second payment information.

12. A content distribution system including at least one distribution server for distributing digital contents via a network in response to requests from user terminals, said content distribution system comprising:
 a reference server operable to hold at least one piece of location information showing a location of said at least one distribution server on the network, and to transmit one of the pieces of location information to one of the user terminals in response to a user request; and
 a billing server operable to perform settling of accounts once a digital content has been transmitted to one of the user terminals;
wherein said billing server includes:
 a determining unit operable to determine, when said distribution server is accessed by the user terminal, whether the user terminal has connected to the distribution server by using one of the at least one pieces of location information received from said reference server as a connection target;
 a generating unit operable to generate
  (1) a piece of first payment information instructing the user terminal to pay a purchase fee to said distribution server, when the user terminal is determined by said determining unit to have connected without receiving the piece of location information from said reference server, and
  (2) a piece of second payment information instructing the user terminal to pay a predetermined percentage of a purchase fee to the reference server as a commission for providing the location of said distribution server to the user terminal, and to pay a remainder of the purchase fee to said reference server, when the user terminal is determined by said determining unit to have connected by using the piece of location information received from said reference server; and
 a transmitting unit operable to transmit one of the generated pieces of first and second payment information.

* * * * *